US012726984B2

(12) United States Patent
You et al.

(10) Patent No.: US 12,726,984 B2
(45) Date of Patent: Sep. 1, 2026

(54) METHOD AND APPARATUS FOR TRANSMITTING UPLINK CONTROL INFORMATION

(71) Applicant: LG Electronics Inc., Seoul (KR)

(72) Inventors: Hyangsun You, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 218 days.

(21) Appl. No.: 18/281,360

(22) PCT Filed: Apr. 5, 2022

(86) PCT No.: PCT/KR2022/004857
§ 371 (c)(1),
(2) Date: Sep. 11, 2023

(87) PCT Pub. No.: WO2022/216002
PCT Pub. Date: Oct. 13, 2022

(65) Prior Publication Data

US 2025/0089054 A1 Mar. 13, 2025

(30) Foreign Application Priority Data

Apr. 6, 2021 (KR) ........................ 10-2021-0044627
May 11, 2021 (KR) ........................ 10-2021-0060841

(51) Int. Cl.
*H04W 72/21* (2023.01)
*H04L 1/06* (2006.01)
(Continued)

(52) U.S. Cl.
CPC ........... *H04W 72/21* (2023.01); *H04L 1/0693* (2013.01); *H04L 1/1812* (2013.01); *H04W 72/232* (2023.01)

(58) Field of Classification Search
CPC .. H04W 72/21; H04W 72/232; H04L 1/0693; H04L 1/1812
See application file for complete search history.

(56) References Cited

U.S. PATENT DOCUMENTS 10,938,519 B2 * 3/2021 Huang .................. H04L 5/0055
11,019,607 B2 * 5/2021 Papasakellariou .... H04L 1/1861
(Continued)

FOREIGN PATENT DOCUMENTS

CN 115190621 A * 10/2022 ........... H04L 1/0067
CN 117256118 A * 12/2023
(Continued)

OTHER PUBLICATIONS

3GPP TS 38.212 V17.1.0 (Mar. 2022), 3rd Generation Partnership Project Technical Specification Group Radio Access Network, study on Multiplexing and channel coding (Release 17), Mar. 2022, 199 pages.
(Continued)

*Primary Examiner* — Michael J Moore, Jr.
(74) *Attorney, Agent, or Firm* — Fish & Richardson P.C.

(57) ABSTRACT

Provided are a method and apparatus for determining the number of coded modulation symbols for uplink control information (UCI) when transmitting, in a wireless communication system, the UCI via a transport block processing over multiple slots (TBoMS) PUSCH to which TBoMS has been applied. The number of coded modulation symbols for the UCI is determined on the basis of the total number of bits being transmitted via the TBoMS PUSCH, and a value obtained by multiplying the number (Z) of slots configured for the TBoMS PUSCH by the sum of the number of resource elements that can be used for the transmission of
(Continued)

Determining the number of coded modulation symbols of the UCI — S131

Transmitting the UCI on the TBoMS PUSCH transmitted through a plurality of slots — S132 the UCI in OFDM symbols for the TBoMS PUSCH in one slot through which the UCI is transmitted, from among the multiple slots.

11 Claims, 18 Drawing Sheets

(51) Int. Cl.
*H04L 1/1812* (2023.01)
*H04W 72/232* (2023.01)

(56) References Cited

U.S. PATENT DOCUMENTS 12,408,173 B2 * 9/2025 Khoshnevisan ...... H04L 5/0053
2020/0295899 A1 9/2020 Xiong et al.
2022/0045789 A1 * 2/2022 Karmoose ............. H04L 1/0041
2022/0272725 A1 * 8/2022 Taherzadeh Boroujeni ................ H04L 1/08
2022/0346091 A1 * 10/2022 Karmoose ............. H04L 1/0072
2024/0073874 A1 * 2/2024 Su ........................... H04L 1/189
2024/0163011 A1 * 5/2024 Hasegawa ............. H04L 1/0071
2024/0163067 A1 * 5/2024 Xiong ................... H04L 5/0053
2024/0179692 A1 * 5/2024 Xiong ............... H04W 72/0446
2024/0188087 A1 * 6/2024 Zhou ..................... H04L 1/1671
2025/0089054 A1 * 3/2025 You ..................... H04W 72/232

FOREIGN PATENT DOCUMENTS

EP 4322446 A1 * 2/2024 ........... H04L 1/1812
WO WO-2013133656 A1 * 9/2013 ............ H04W 72/21

OTHER PUBLICATIONS

Apple Inc., "Remaining issues on UCI and PUSCH enhancements for eURLLC," 3GPP TSG RAN WG1 #104-e, R1-2101347, e-Meeting, Jan. 25-Feb. 5, 2021, 10 pages.
International Search Report and Written Opinion in International Appln. No. PCT/KR2022/004857, mailed on Jul. 7, 2022, 6 pages (with English translation).
Lenovo, Motorola Mobility, "Intra-UE multiplexing enhancement for IIoT/URLLC," 3GPP TSG RAN WG1 #104-e, R1-2100996, e-Meeting, Jan. 25-Feb. 5, 2021, 9 pages.
Moderator (Nokia, Nokia Shanghai Bell), "FL summary of TB processing over multi-slot PUSCH (AI 8.8.1.2)," 3GPP TSG RAN WG1 #104-e, R1-2102241, e-Meeting, Jan. 25- Feb. 5, 2021, 80 pages.
3GPP TS 38.212 V16.4.0 (Dec. 2020), 3rd Generation Partnership Project Technical Specification Group Radio Access Network, Study on Multiplexing and channel coding (Release 16), Dec. 2020, 152 pages.
Extended European Search Report in European Appln. No. 22784911.4, mailed on Jan. 14, 2025, 11 pages.
LG Electronics, "Discussions on TB processing over multi-slot PUSCH," R1-2100713, 3GPP TSG RAN WG1 #104-e, a-Meeting, Jan. 25-Feb. 5, 2021, 4 pages.

* cited by examiner

PUSCH repetition type A (a)

Figure 20:
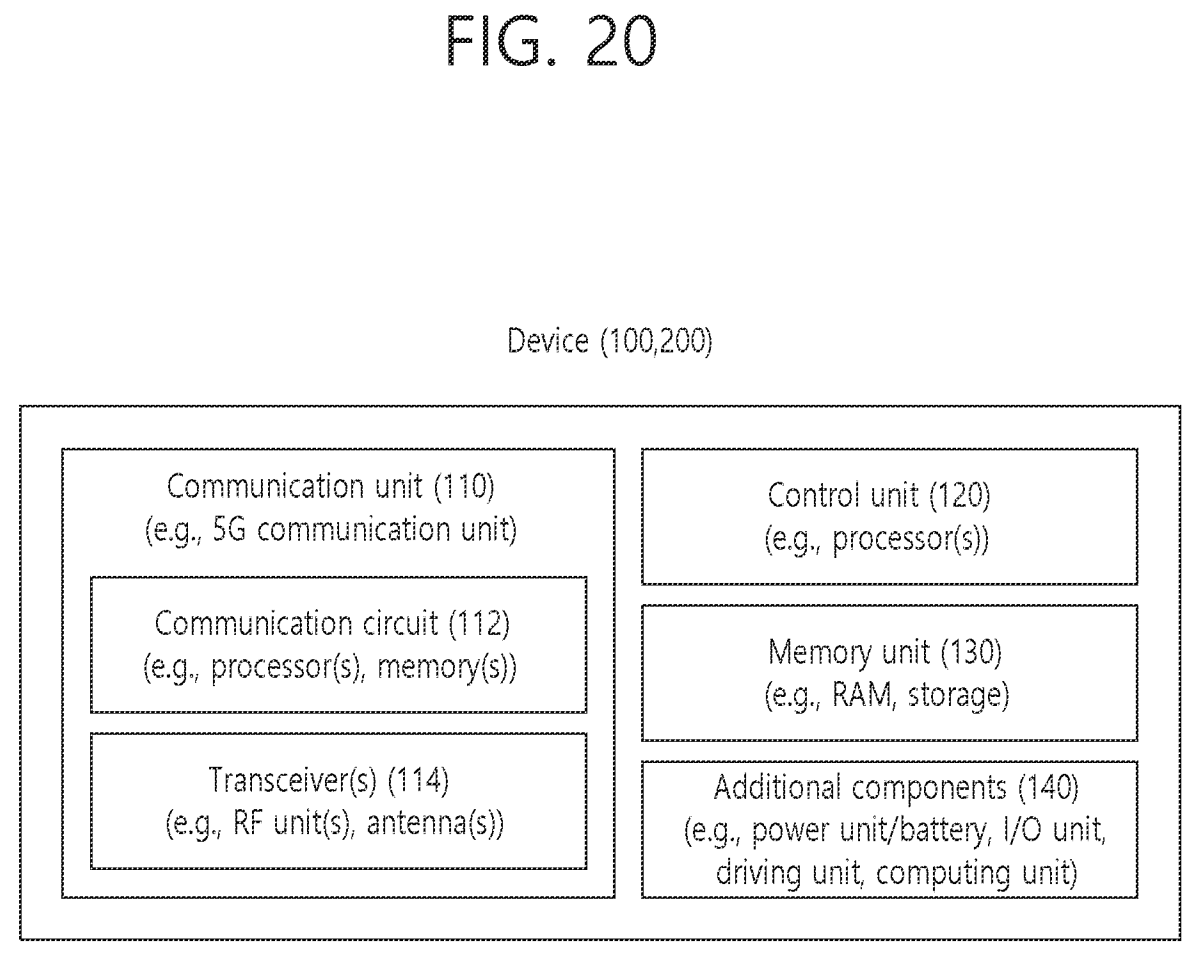

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit, driving unit, computing unit)

METHOD AND APPARATUS FOR TRANSMITTING UPLINK CONTROL INFORMATION

CROSS-REFERENCE TO RELATED APPLICATIONS

This application is a National Stage application under 35 U.S.C. § 371 of International Application No. PCT/KR2022/004857, filed on Apr. 5, 2022, which claims the benefit of Korean Patent Application No. 10-2021-0044627, filed on Apr. 6, 2021, and Korean Patent Application No. 10-2021-0060841, filed on May 11, 2021. The disclosures of the prior applications are hereby incorporated by reference herein in their entirety.

TECHNICAL FIELD

The present disclosure relates to a method for transmitting uplink control information in a wireless communication system and an apparatus using the method.

BACKGROUND

As a growing number of communication devices require higher communication capacity, there is a need for advanced mobile broadband communication as compared to existing radio access technology (RAT). Massive machine-type communication (MTC), which provides a variety of services anytime and anywhere by connecting a plurality of devices and a plurality of objects, is also one major issue to be considered in next-generation communication. In addition, designs for communication systems considering services or a user equipment (UE) sensitive to reliability and latency are under discussion. Introduction of next-generation RAT considering enhanced mobile broadband communication, massive MTC, and ultra-reliable and low-latency communication (URLLC) is under discussion. In this disclosure, for convenience of description, this technology may be referred to as new RAT or new radio (NR). NR is also referred to as a fifth generation (5G) system.

In the existing wireless communication system, a transport block (TB) is mapped to one transmission time interval (TTI, for example, a slot) and transmitted. However, in a future wireless communication system such as NR, a transport block may be mapped to a plurality of TTIs (slots) and transmitted. This is called TB processing over multi-slot (TBoMS). TBoMS may be applied to physical uplink shared channel (PUSCH) transmission, and a PUSCH to which TBoMS is applied may be referred to as a TBoMS PUSCH. Repeated transmission can also be applied to TBoMS PUSCH transmission to improve coverage.

Meanwhile, uplink control information (UCI) may be transmitted through PUSCH in some cases. At this time, it is necessary to determine the number of resource elements for UCI (the number of coded modulation symbols of UCI in an equivalent sense). Since the conventional standard technology assumes that the PUSCH is transmitted in one slot, it is difficult to apply the conventional standard technology as it is when UCI is multiplexed and transmitted on the TBoMS PUSCH.

SUMMARY

A technical problem to be solved by the present disclosure is to provide a method for transmitting uplink control information in a wireless communication system and an apparatus using the method.

Technical Solution

The present specification provides a method for transmitting uplink control information (UCI) of a device, a method for receiving UCI, and devices using the method. Specifically, a device (e.g., UE) determines the number of coded modulation symbols of the UCI, and transmits the UCI on a TBoMS PUSCH transmitted through a plurality of slots. At this time, the number of the coded modulation symbols of the UCI is determined based on a value obtained by multiplying the sum of the number of resource elements that can be used for transmission of the UCI in OFDM symbols from symbol index 0 to $N^{PUSCH}_{symb,all}-1$ in one slot with the UCI transmission among the plurality of slots by the number (Z) of slots configured for the TBoMS PUSCH and the total number of bits transmitted through the TBoMS PUSCH. The $N^{PUSCH}_{symb,all}$ is the total number of OFDM symbols of the PUSCH in the one slot.

The device includes a transceiver for transmitting and receiving radio signals and a processor operating in conjunction with the transceiver. The processor performs the aforementioned UCI transmission method.

A chipset in a device includes a processor and a memory coupled to the processor and storing instructions executed by the processor. The processor performs the aforementioned UCI transmission method.

The above-described UCI transmission method may be performed by instructions in a computer readable medium (CRM).

In terms of the base station, a UCI receiving method is provided. The method includes transmitting downlink control information indicating the number of slots (Z) of the TBoMS PUSCH to a UE, and receiving the UCI through the TBoMS PUSCH transmitted through a plurality of slots from the UE. The number of the coded modulation symbols of the UCI is determined based on a value obtained by multiplying the sum of the number of resource elements that can be used for transmission of the UCI in OFDM symbols from symbol index 0 to $N^{PUSCH}_{symb,all}-1$ in one slot with the UCI transmission among the plurality of slots by the number (Z) of slots configured for the TBoMS PUSCH and the total number of bits transmitted through the TBoMS PUSCH. The $N^{PUSCH}_{symb,all}$ is the total number of OFDM symbols of the PUSCH in the one slot.

The base station includes a transceiver for transmitting and receiving radio signals and a processor operating in combination with the transceiver, and the UCI receiving method may be performed by the processor.

According to the present disclosure, when UCI is multiplexed and transmitted on a TBoMS PUSCH transmitted over a plurality of slots, the number of resource elements required for transmission can be correctly calculated. Therefore, the UE can determine the number of UCI transmission resource elements according to the performance targeted by the base station. In addition, since misunderstanding regarding the number of UCI transmission resource elements does not occur between the base station and the UE, efficient communication is possible and ambiguity does not occur.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described in the present specification, and may include various effects that can be understood or derived from the technical features of the present specification.

BRIEF DESCRIPTION OF THE DRAWINGS

FIG. 20 shows another example of a wireless device applied to the present specification.

DETAILED DESCRIPTION

Figure 1:
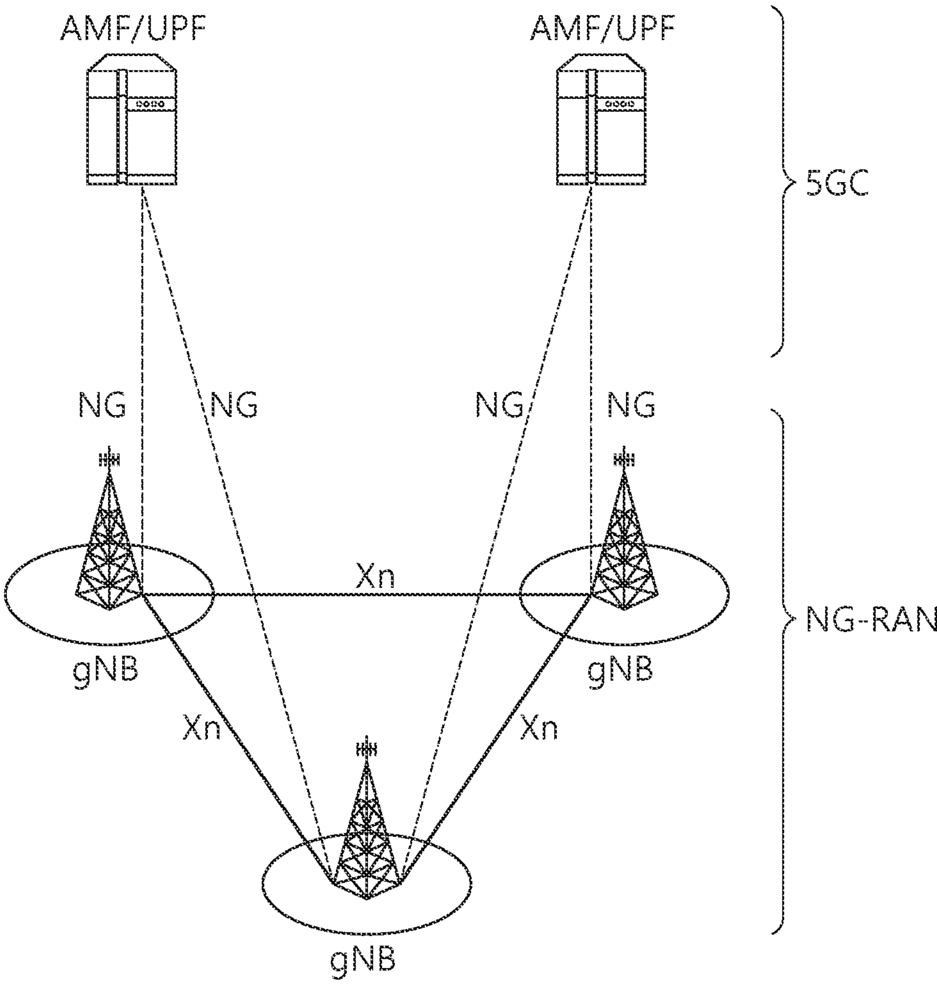
FIG. 1 illustrates a system structure of a New Generation Radio Access Network (NG-RAN) to which NR is applied.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition. "at least one of A. B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

Technical features described individually in one figure in the present specification may be individually implemented, or may be simultaneously implemented.

A wireless communication system to which the present disclosure may be referred to as an Evolved-UMTS Terrestrial Radio Access Network (E-UTRAN) or a Long Term Evolution (LTE)/LTE-A system, for example.

The E-UTRAN includes at least one base station (BS) which provides a control plane and a user plane to a user equipment (UE). The UE may be fixed or mobile, and may be referred to as another terminology, such as a mobile station (MS), a user terminal (UT), a subscriber station (SS), a mobile terminal (MT), a wireless device, terminal, etc. The BS is generally a fixed station that communicates with the UE and may be referred to as another terminology, such as an evolved node-B (eNB), a base transceiver system (BTS), an access point, gNB, etc.

The BSs are interconnected by means of an X2 interface. The BSs are also connected by means of an S1 interface to an evolved packet core (EPC), more specifically, to a mobility management entity (MME) through S1-MME and to a serving gateway (S-GW) through S1-U.

The EPC includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present disclosure for convenience.

FIG. 1 illustrates a system structure of a next generation radio access network (NG-RAN) to which NR is applied.

Referring to FIG. 1, the NG-RAN may include a gNB and/or an eNB that provides user plane and control plane protocol termination to a UE. FIG. 1 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
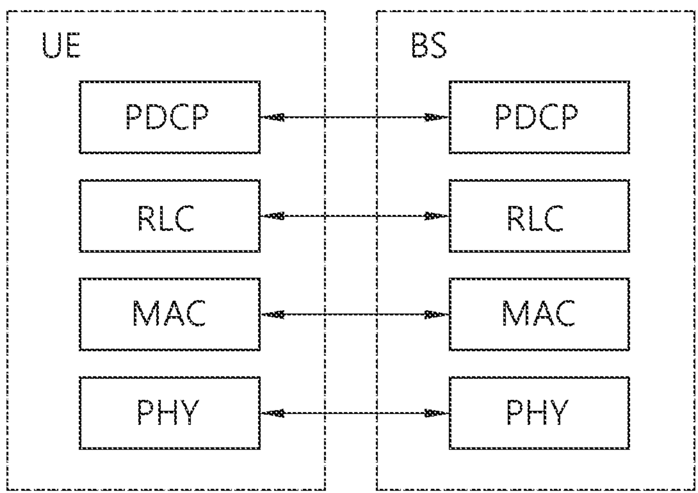
FIG. 2 is a diagram showing a wireless protocol architecture for a user plane.
Figure 3:
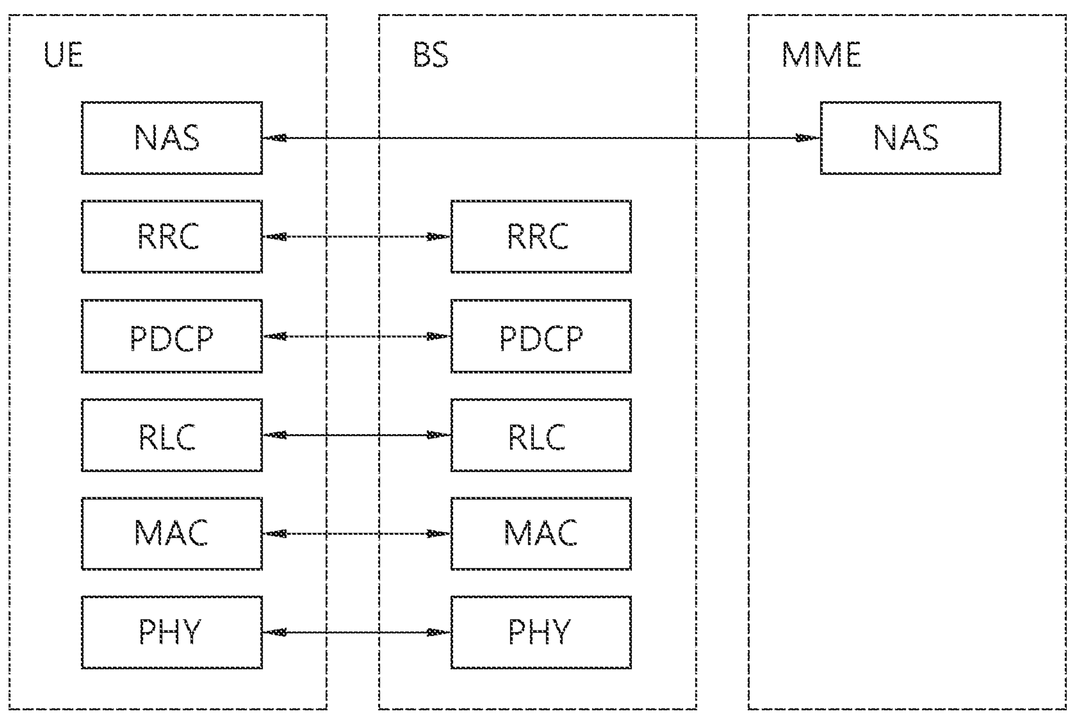
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for transmission such as a slot/subframe.

Figure 4:
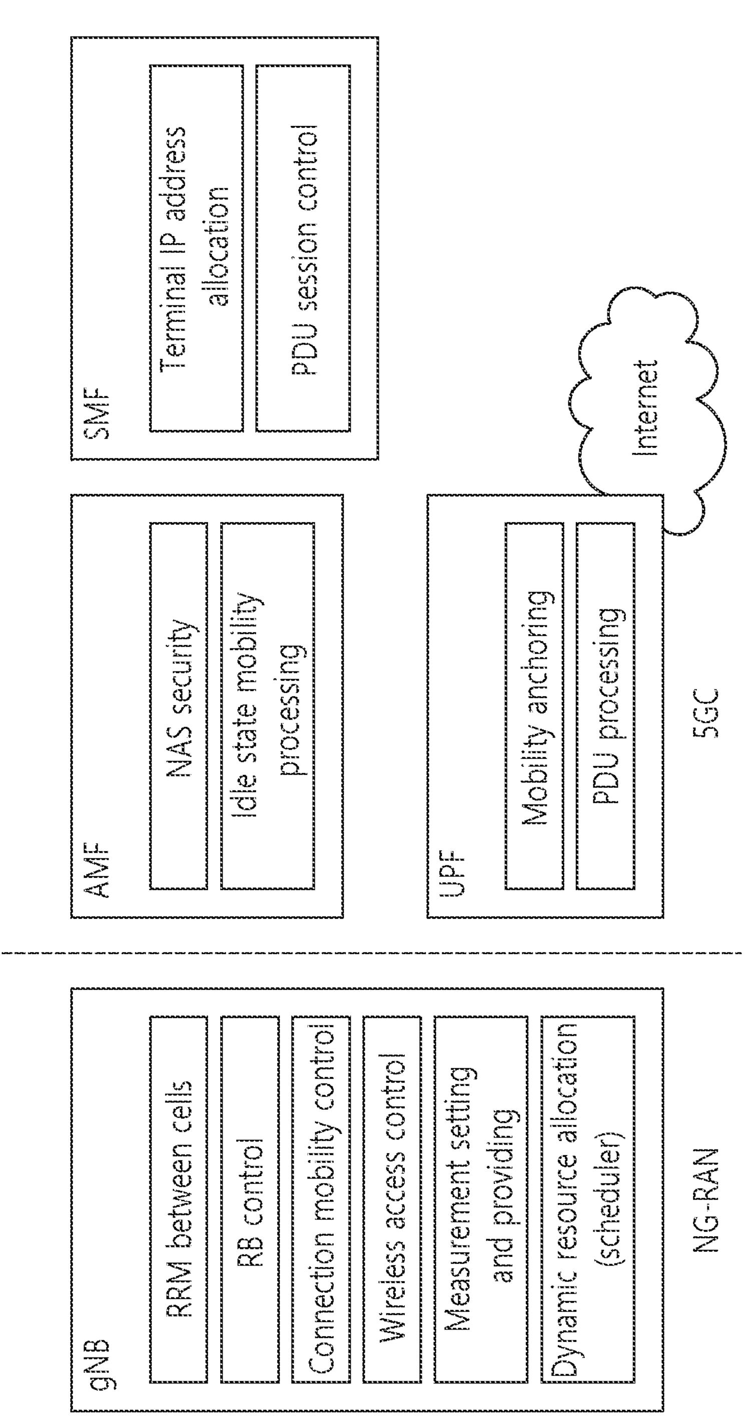
FIG. 4 illustrates a functional division between an NG-RAN and a 5GC.

FIG. 4 illustrates a functional division between an NG-RAN and a 5GC.

Referring to FIG. 4, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring. PDU processing, and the like. The SMF may provide functions such as UE IP address assignment, PDU session control, and so on.

Figure 5:
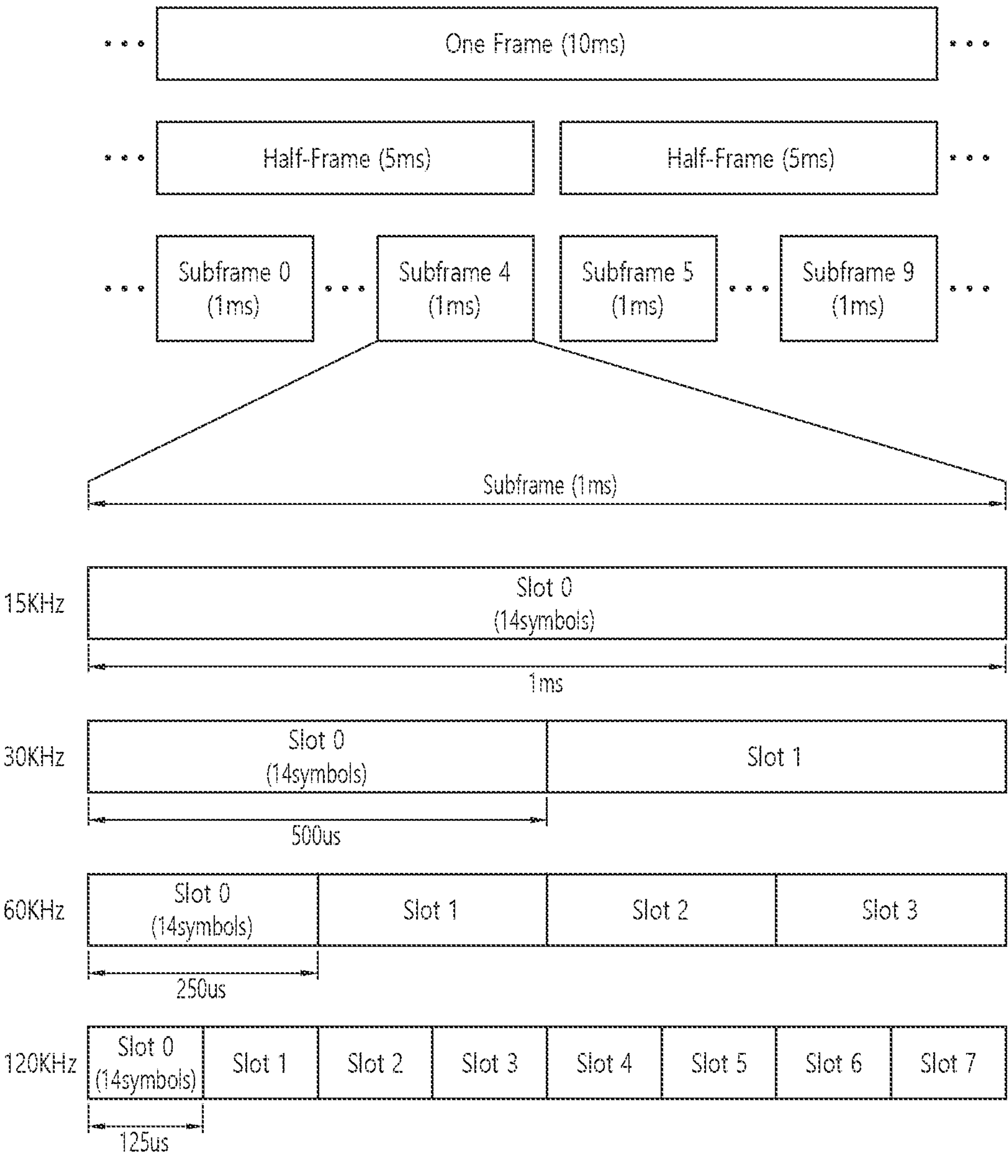
FIG. 5 illustrates an example of a frame structure that may be applied in NR.

FIG. 5 illustrates an example of a frame structure that may be applied in NR.

Referring to FIG. 5, a radio frame (which may be called as a frame hereinafter) may be used for uplink and downlink transmission in NR. A frame has a length of 10 ms and may be defined as two 5 ms half-frames (Half-Frame, HF). A half-frame may be defined as five 1 ms subframes (Subframe, SF). A subframe may be divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbol may include an OFDM symbol (or a CP-OFDM symbol) and an SC-FDMA symbol (or a DFT-s-OFDM symbol).

The following table 1 illustrates a subcarrier spacing configuration p.

TABLE 1

| μ | $\Delta f = 2^{\mu} \cdot 15$[kHz] | Cyclic prefix |
|---|---|---|
| 0 | 15 | Normal |
| 1 | 30 | Normal |
| 2 | 60 | Normal<br>Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations p.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 5, μ=0, 1, 2, and 3 are exemplified.

Table 2-1 below exemplifies that the number of symbols per slot, the number of slots per frame, and the number of slots per subframe vary according to SCS (μ=2, 60 KHz) when the extended CP is used.

TABLE 2-1

| μ | $N^{slot}_{symb}$ | $N^{frame,u}_{slot}$ | $N^{subframe,u}_{slot}$ |
|---|---|---|---|
| 2 | 12 | 40 | 4 |

In an NR system, OFDM(A) numerologies (e.g., SCS, CP length, and so on) may be differently configured between a plurality of cells integrated to one UE. Accordingly, an (absolute time) duration of a time resource (e.g., SF, slot or TTI) (for convenience, collectively referred to as a time unit (TU)) configured of the same number of symbols may be differently configured between the integrated cells.

Figure 6:
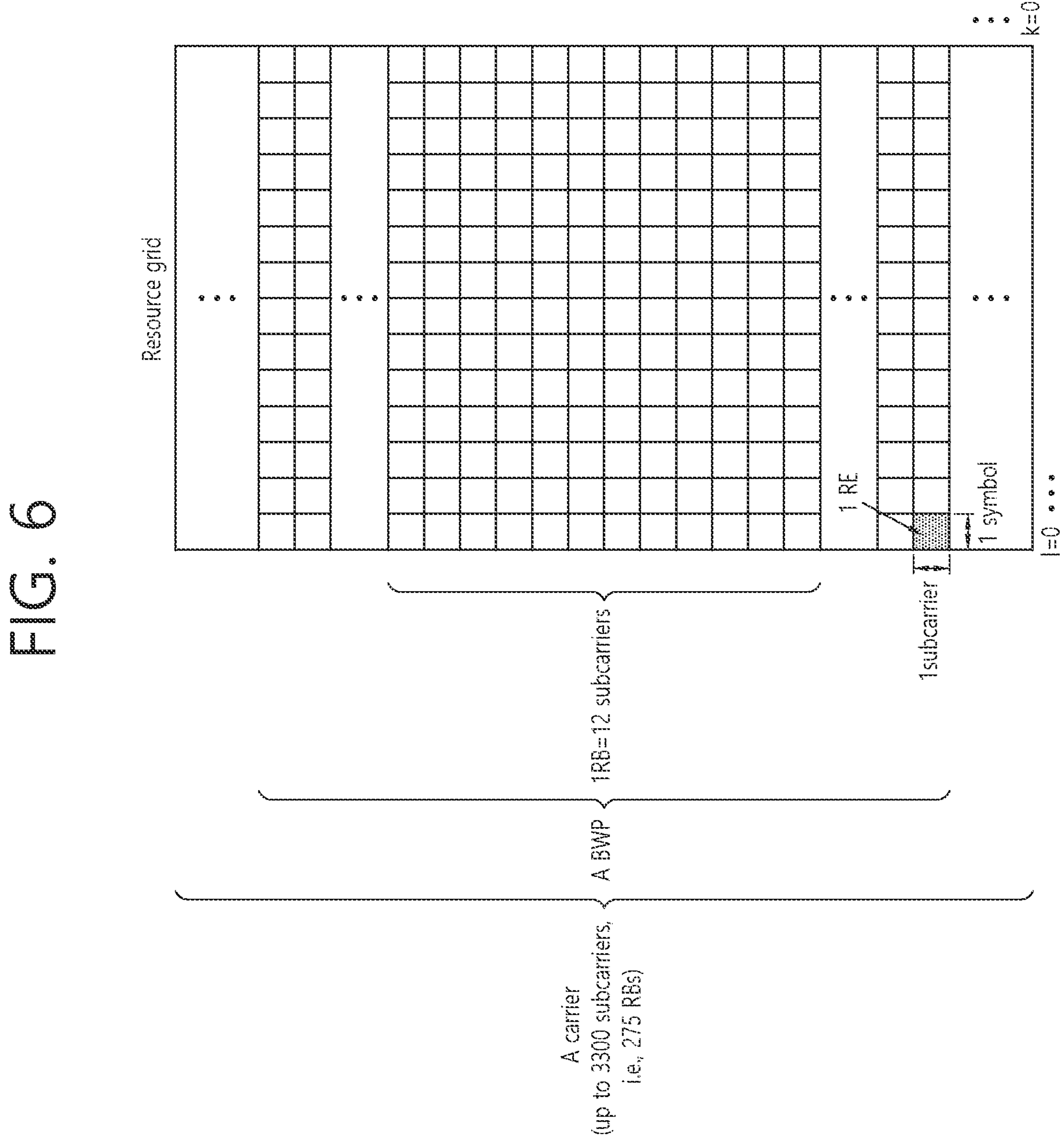
FIG. 6 illustrates a slot structure of the NR frame.

FIG. 6 illustrates a slot structure of a NR frame.

A slot may comprise a plurality of symbols in a time domain. For example, in case of a normal CP, one slot may include 14 symbols. However, in case of an extended CP, one slot may include 12 symbols. The carrier may include a plurality of subcarriers in a frequency domain. A resource block (RB) may be defined as a plurality of consecutive subcarriers (e.g., 12) in the frequency domain. A bandwidth part (BWP) may be defined as a plurality of consecutive (P)RBs in the frequency domain, and may correspond to one numerology (e.g., SCS, CP length, etc.). A carrier may include a maximum of N (e.g., 5) BWPs. Data communication is performed through the activated BWP, and only one BWP can be activated for one UE. Each element in the resource grid is referred to as a resource element (RE), and one complex symbol may be mapped thereto.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Monitoring means decoding each PDCCH candidate according to a downlink control information (DCI) format. The UE monitors a set of PDCCH candidates in one or more control resource sets (CORESETs, described below) on the activated DL BWP of each activated serving cell for which PDCCH monitoring is configured according to a corresponding search space set.

A new unit called a control resource set (CORESET) may be introduced in the NR. The UE may receive a PDCCH in the CORESET.

The CORESET includes $N^{CORESET}_{RB}$ resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. A plurality of CCEs (or REGs) may be included in the CORESET. One CCE may be composed of a plurality of resource element groups (REGs), and one REG may include one OFDM symbol in the time domain and 12 resource elements in the frequency domain.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the UE.

A control region (800) in the conventional wireless communication system (e.g., LTE/LTE-A) is configured over the entire system band used by a base station (BS). All the UEs, excluding some (e.g., eMTC/NB-IoT UE) supporting only a narrow band, should be able to receive wireless signals of the entire system band of the BS in order to properly receive/decode control information transmitted by the BS.

On the other hand, in NR, CORESET described above was introduced. CORESETs are radio resources for control information to be received by the UE and may use only a portion, rather than the entirety of the system bandwidth in the frequency domain. In addition, in the time domain, only some of the symbols in the slot may be used. The BS may allocate the CORESET to each UE and may transmit control information through the allocated CORESET.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

Self-Contained Subframe Structure

In NR, a structure in which a control channel and a data channel are time-division-multiplexed within one TTI can be considered as a frame structure in order to minimize latency.

Downlink (DL) transmission and uplink (UL) transmission are sequentially performed within one subframe and thus DL data can be transmitted and UL ACK/NACK (Acknowledgement/negative-acknowledgement) can be received within the subframe. Consequently, a time required from occurrence of a data transmission error to data retransmission is reduced, thereby minimizing latency in final data transmission.

In this data and control TDMed subframe structure, a time gap for a base station and a UE to switch from a transmission mode to a reception mode or from the reception mode to the transmission mode may be required. To this end, some OFDM symbols at a time when DL switches to UL may be set to a guard period (GP) in the self-contained subframe structure.

Figure 7:
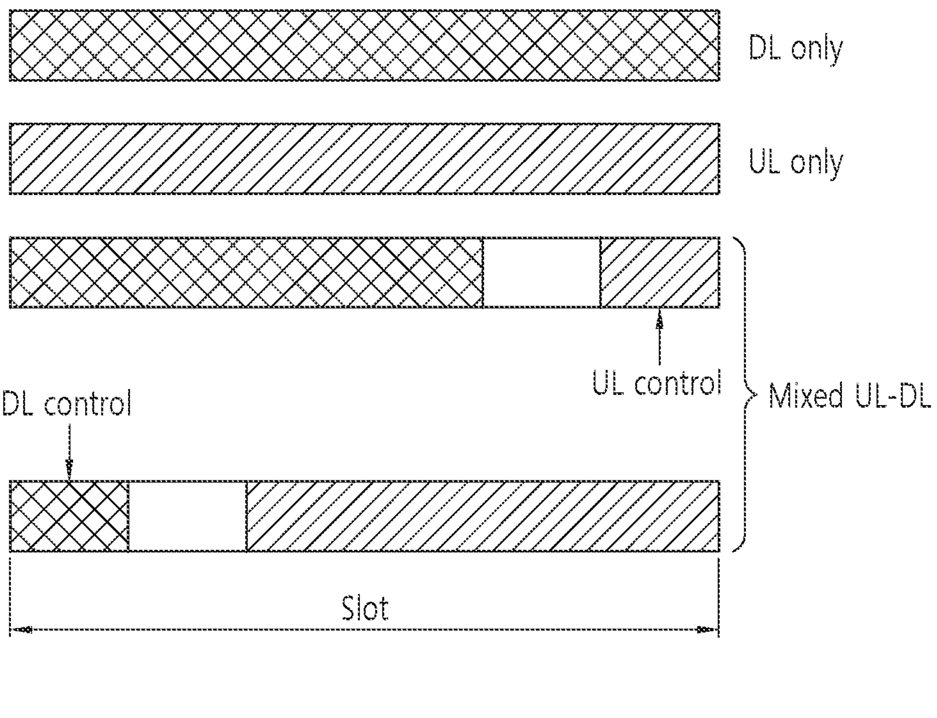
FIG. 7 illustrates a structure of self-contained slot.

FIG. 7 illustrates a structure of self-contained slot.

In NR system, one slot includes all of a DL control channel, DL or UL data channel, UL control channel, and so on. For example, the first N symbols in a slot may be used for transmitting a DL control channel (in what follows, DL control region), and the last M symbols in the slot may be used for transmitting an UL control channel (in what follows, UL control region). N and M are each an integer of 0 or larger. A resource region located between the DL and UL control regions (in what follows, a data region) may be used for transmission of DL data or UL data. As one example, one slot may correspond to one of the following configurations. Each period is listed in the time order.

1. DL only configuration
2. UL only configuration
3. Mixed UL-DL configuration

DL region+GP (Guard Period)+UL control region

DL control region+GP+UL region a DL region: (i) a DL data region, (ii) DL control region plus DL data region a UL region: (i) an UL data region, (ii) UL data region plus UL control region.

In the DL control region, a PDCCH may be transmitted, and in the DL data region, a PDSCH may be transmitted. In the UL control region, a PUCCH may be transmitted, and in the UL data region, a PUSCH may be transmitted. In the PDCCH, Downlink Control Information (DCI), for example, DL data scheduling information or UL data scheduling information may be transmitted. In the PUCCH, Uplink Control Information (UCI), for example, ACK/NACK (Positive Acknowledgement/Negative Acknowledgement) information with respect to DL data, Channel State Information (CSI) information, or Scheduling Request (SR) may be transmitted. A GP provides a time gap during a process where a gNB and a UE transition from the transmission mode to the reception mode or a process where the gNB and UE transition from the reception mode to the transmission mode. Part of symbols belonging to the occasion in which the mode is changed from DL to UL within a subframe may be configured as the GP.

In the NR, in a time domain, a synchronization signal block (SSB, or also referred to as a synchronization signal and physical broadcast channel (SS/PBCH) block) may consist of 4 OFDM symbols indexed from 0 to 3 in an ascending order within a synchronization signal block, and a primary synchronization signal (PSS), secondary synchronization signal (SSS), and a PBCH associated with demodulation reference signal (DMRS) may be mapped to the symbols. As described above, the synchronization signal block (SSB) may also be represented by an SS/PBCH block.

In NR, since a plurality of synchronization signal blocks (SSBs) may be transmitted at different times, respectively, and the SSB may be used for performing initial access (IA), serving cell measurement, and the like, it is preferable to transmit the SSB first when transmission time and resources of the SSB overlap with those of other signals. To this purpose, the network may broadcast the transmission time and resource information of the SSB or indicate them through UE-specific RRC signaling.

Figure 8:
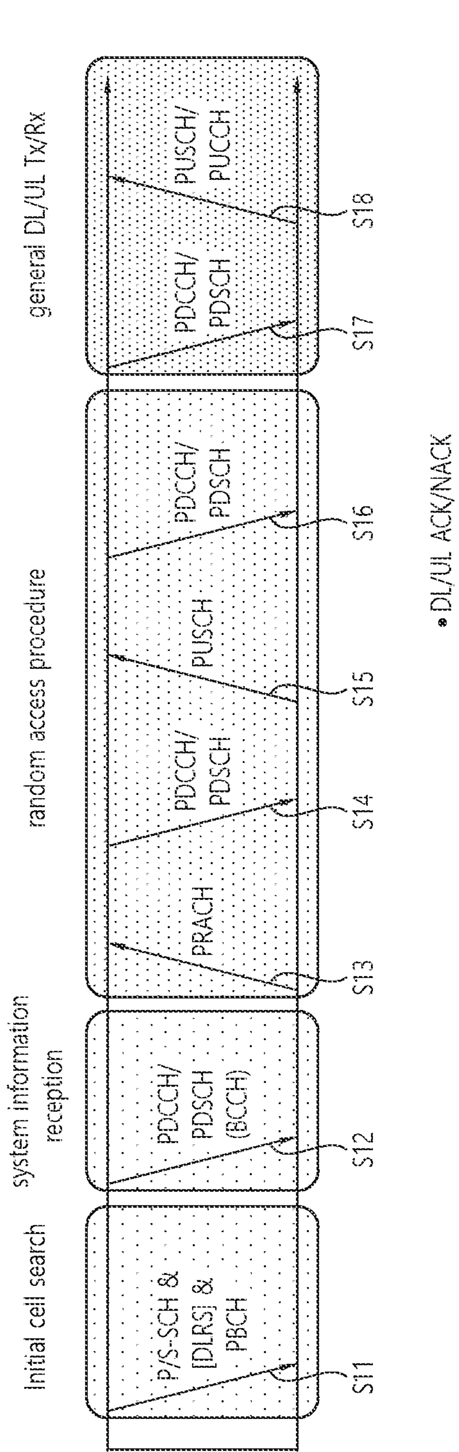
FIG. 8 illustrates physical channels and general signal transmission.

FIG. 8 illustrates physical channels and typical signal transmission.

Referring to FIG. 8, in a wireless communication system, a UE receives information from a BS through a downlink (DL), and the UE transmits information to the BS through an uplink (UL). The information transmitted/received by the BS and the UE includes data and a variety of control information, and there are various physical channels according to a type/purpose of the information transmitted/received by the BS and the UE.

The UE which is powered on again in a power-off state or which newly enters a cell performs an initial cell search operation such as adjusting synchronization with the BS or the like (S11). To this end, the UE receives a primary synchronization channel (PSCH) and a secondary synchronization channel (SSCH) from the BS to adjust synchronization with the BS, and acquire information such as a cell identity (ID) or the like. In addition, the UE may receive a physical broadcast channel (PBCH) from the BS to acquire broadcasting information in the cell. In addition, the UE may receive a downlink reference signal (DL RS) in an initial cell search step to identify a downlink channel state.

Upon completing the initial cell search, the UE may receive a physical downlink control channel (PDCCH) and a physical downlink control channel (PDSCH) corresponding thereto to acquire more specific system information (S12).

Thereafter, the UE may perform a random access procedure to complete an access to the BS (S13-S16). Specifically, the UE may transmit a preamble through a physical random access channel (PRACH) (S13), and may receive a random access response (RAR) for the preamble through a PDCCH and a PDSCH corresponding thereto (S14). Thereafter, the UE may transmit a physical uplink shared channel (PUSCH) by using scheduling information in the RAR (S15), and may perform a contention resolution procedure similarly to the PDCCH and the PDSCH corresponding thereto (S16).

After performing the aforementioned procedure, the UE may perform PDCCH/PDSCH reception (S17) and PUSCH/physical uplink control channel (PUCCH) transmission (S18) as a typical uplink/downlink signal transmission procedure. Control information transmitted by the UE to the BS is referred to as uplink control information (UCI). The UCI includes hybrid automatic repeat and request (HARQ) acknowledgement (ACK)/negative-ACK (NACK), scheduling request (SR), channel state information (CSI), or the like. The CSI includes a channel quality indicator (CQI), a precoding matrix indicator (PMI), a rank indication (RI), or the like. In general, the UCI is transmitted through the PUCCH. However, when control information and data are to be transmitted simultaneously, the UCI may be transmitted through the PUSCH. In addition, the UE may aperiodically transmit the UCI through the PUSCH according to a request/instruction of a network.

Hereinafter, coverage enhancement, which is currently under discussion, will be described.

Because coverage directly affects service quality and cost (e.g., CAPEX (Capital Expenses) and OPEX (Operating Expenses)), it is one of the key factors that telecommunication companies consider when commercializing cellular networks. Many countries are making more spectrum available in FR1, such as 3.5 GHz, which is usually a higher frequency than LTE or 3G.

NR is designed to operate at much higher frequencies such as 28 GHz or 39 GHz in FR2 compared to LTE. Higher frequencies inevitably cause radio channels to experience higher path loss, making it more difficult to maintain the same quality of service as legacy RAT (radio access technology).

An important mobile application is a voice service that expects ubiquitous coverage at all times, no matter where the general subscriber is.

In evaluating baseline performance, the following channels may be potential bottlenecks for FR1.

In the first order, PUSCH for eMBB (for FDD and TDD with DDDSU, DDDSUDDSUU and DDDDDDDSUU), PUSCH for VoIP (for FDD and TDD with DDDSU, DDDSUDDSUU).

In the second order, PRACH format B4, PUSCH of message 3, PUCCH format 1, PUCCH format 3 of 11 bits, PUCCH format 3 of 22 bits, broadcast PDCCH.

The next channel could be a potential bottleneck for the city's 28 GHz scenario. PUSCH for eMBB (DDDSU and DDSU), PUSCH for VoIP (DDDSU and DDSU), PUCCH format 3 of 11 bits, PUCCH format 3 of 22 bits, PRACH format B4, and PUSCH of message 3.

For PUSCH enhancement, the following may be discussed.

For enhancement to PUSCH repetition type A, 1) the maximum number of repetitions can be increased to a number determined in the course of work, or 2) the number of repetitions calculated based on available uplink slots may be used.

In order to support TB (transport block) processing through the multi-slot PUSCH, the TBS (transport block size) may be determined based on the multi-slot and transmitted through the multi-slot.

To enable joint channel estimation, a mechanism that enables joint channel estimation for multiple PUSCH transmissions may be specified based on conditions for maintaining power consistency and phase continuity.

Inter-slot frequency hopping using inter-slot bundling that enables joint channel estimation may be considered.

To improve PUCCH, the following mechanisms may be considered. 1) a signaling mechanism to support dynamic PUCCH repetition factor indication. 2) a mechanism supporting DM-RS (demodulation-reference signal: DMRS) bundling over PUCCH repetitions, 3) a mechanism to support PUSCH repetition type A for message 3.

Based on this discussion, in the case of performing TB processing over multi-slot (TBoMS) PUSCH operation over multiple slots for coverage enhancement of the UE, an operation when PUSCH transmission and PUCCH transmission overlap will be described.

PUSCH repetition type A and type B are introduced in NR Rel-15/16, and transmission is performed as follows according to the PUSCH repetition type.

1. PUSCH Repetition Type A

Figure 9:
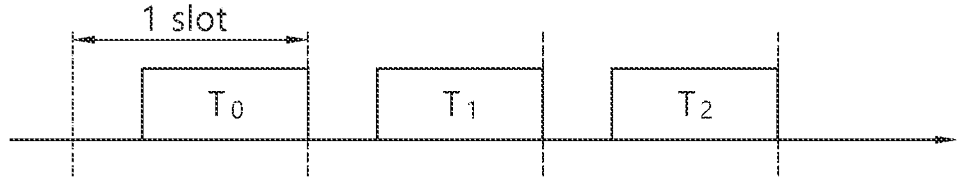
FIG. 9 illustrates PUSCH repetition type A.

FIG. 9 illustrates PUSCH repetition type A.

Referring to FIG. 9, PUSCH repetition type A is a slot based repetition. As shown in FIG. 9, repetition is performed with the same PUSCH transmission start symbol position and PUSCH transmission symbol length (meaning the number of symbols transmitting PUSCH) for each slot. At this time, if there is an invalid symbol that cannot be used for PUSCH transmission among symbol resources constituting a specific PUSCH repetition, the transmission of the corresponding PUSCH repetition is dropped and not performed. For example, when a total of 4 repeated PUSCH transmissions of Rep0, Rep1, Rep2, and Rep3 are performed, when an invalid symbol is included in the symbol resource constituting Rep1, the transmission of Rep1 is dropped, and only transmissions of Rep0, Rep2, and Rep3 are performed. Accordingly, the number of repetitions actually performed may be smaller than the configured number of repetitions.

For PUSCH repetition type A, frequency hopping may be configured for the UE according to a higher layer parameter. One of the following two frequency hopping modes can be configured. 1) Intra-slot frequency hopping, applicable to single slot and multi-slot PUSCH transmission, 2) Inter-slot frequency hopping, applicable to multi-slot PUSCH transmission.

2. PUSCH Repetition Type B

Figure 10:
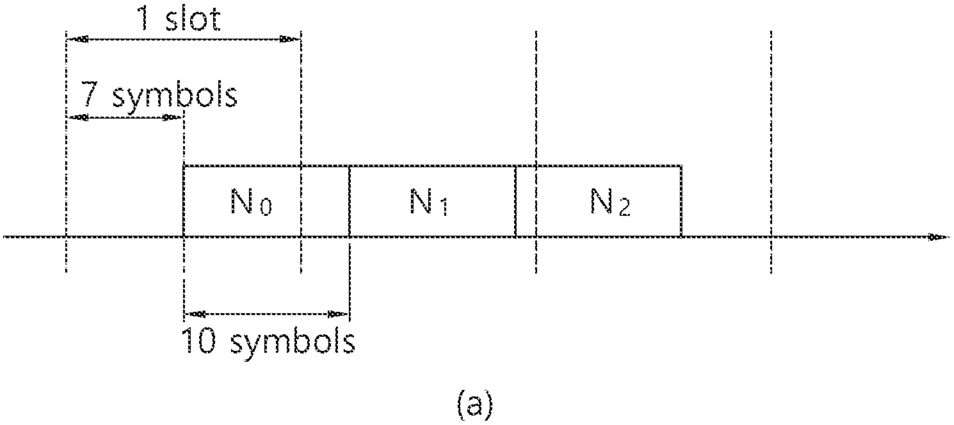
FIG. 10 illustrates PUSCH repetition type B.
Figure 10:
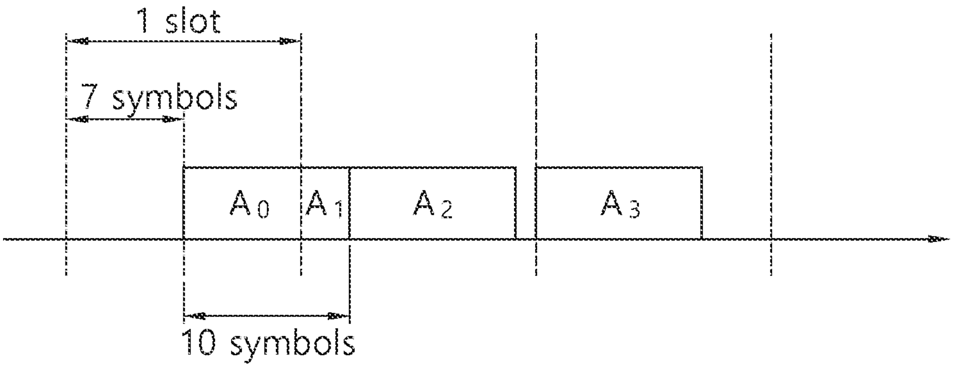

FIG. 10 illustrates PUSCH repetition type B.

Referring to FIG. 10, in PUSCH repetition type B, repetition is performed in units of a symbol length in which an actual PUSCH is transmitted. When the PUSCH is transmitted in 10 symbols as in (a) of FIG. 10, PUSCH repetition is performed in units of 10 consecutive symbols. Nominal repetition is repetition of determining PUSCH repeated transmission time resources without considering slot boundaries, invalid symbols, and the like. However, in the case of actual PUSCH repetition, one PUSCH cannot be transmitted at the slot boundary.

When a PUSCH transmission includes a slot boundary, two actual repetitions are performed based on the slot boundary as shown in (b) of FIG. 10. In addition, one PUSCH transmission may be performed only through consecutive symbols. If there is an invalid symbol in the time resource for which PUSCH repetition is to be transmitted, the actual repetition is constructed using consecutive symbols bounded by an invalid symbol. For example, if symbols #0~#9 constitute one nominal repetition and symbols #3~#5 are invalid symbols, symbols #0~#2 and symbols #6~#9, excluding the invalid symbols, each constitute one actual repetition.

When a symbol that cannot be used for PUSCH transmission (e.g., a symbol indicated as a downlink symbol by DCI format 2_0) is included in one actual repetition resource, the UE drops and does not perform the actual repeated transmission.

When PUSCH repetition type A is applied in NR, the PUSCH transmission slot resource and TB mapping process are as follows.

For PUSCH repetition type A, when transmitting a PUSCH scheduled by DCI format 0_1 or 0_2 having a CRC scrambled to C-RNTI (Radio Network Temporary Identifier), MCS-C-RNTI, or CS-RNTI with NDI (new data indicator)=1 in a PDCCH, the number of repetitions K may be determined as follows.

1) If 'numberofrepetitions' is in the resource allocation table, the number of repetitions K is equal to 'numberofrepetitions'.
2) Else if the UE is configured with 'pusch-AggregationFactor', the number of repetitions K is the same as 'pusch-AggregationFactor'.
3) Otherwise, K=1.

For PUSCH repetition type A, if K>1, the same symbol allocation is applied over K consecutive slots. And PUSCH is limited to a single transport layer.

The UE repeats the TB over K consecutive slots applying the same symbol allocation in each slot. A redundancy version (RV) to be applied to the n (n=0, 1, . . . K−1)th transmission occasion of the TB may be determined according to Table 4 below.

TABLE 4

| $rv_{id}$ indicated by the DCI scheduling the PUSCH | $rv_{id}$ to be applied to $n^{th}$ transmission occasion (repetition type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

In the case of PUSCH repetition type A, if a specific condition is satisfied, PUSCH transmission may be omitted in one slot of multi-slot PUSCH transmission.

A transport block (TB) of PUSCH is mapped and transmitted through symbol resources in one slot. When PUSCH repetition is performed K times by applying PUSCH repetition type A, the TB is repeatedly transmitted K times using K consecutive slots. In this case, the RV (redundancy version) value is determined as shown in Table 4 according to the order of the TB transmission occasion.

The same symbol allocation may be applied to each slot in which TB transmission is performed. Information on symbol allocation used for PUSCH transmission in each slot may be indicated through a time domain resource assignment field of DCI for scheduling PUSCH. The value of SLIV applied by the UE for PUSCH transmission is indicated through the time domain resource assignment (TDRA) field, through this, the PUSCH transmission start symbol position (S) and the transmission symbol length (L) in the slot may be indicated. The UE, for example, may use the S-th symbol to the S+L−1 th symbol in the slot for PUSCH transmission.

Meanwhile, a technique of transmitting one transport block (TB) using symbol resources located in a plurality of slots for coverage enhancement (CE) of a PUSCH may be introduced. Specifically, the time resource constituting the PUSCH is composed of consecutive/non-consecutive symbols located over a plurality of slots, and one transport block (TB) may be mapped to a corresponding PUSCH resource and transmitted.

Alternatively, one PUSCH consists of symbol resources located in one slot, but one TB may be mapped using a plurality of PUSCH resources located in different slots.

As a result, one TB is mapped and transmitted to consecutive/non-consecutive symbol resources located in a plurality of different slots. In this disclosure, this transmission technique is referred to as multi-slot TB mapping.

Meanwhile, when PUSCH transmission and PUCCH transmission are performed in the same slot, PUCCH transmission and PUSCH transmission may be performed as follows.

When PUCCH without repetition and OFDM symbol resources of PUSCH transmission overlap in a specific slot, UCI is multiplexed with PUSCH data and transmitted through PUSCH. That is, UCI piggyback on PUSCH (data and UCI multiplexing) is performed.

When PUCCH with repetition (PUCCH with repetition) and OFDM symbol resources of PUSCH transmission overlap in a specific slot, as follows, PUCCH is transmitted without performing PUSCH transmission in the corresponding slot resource.

When the UE transmits PUCCH over a first number ($N^{repeat}_{PUCCH}$) of slots, transmits PUSCH having a repetition type A over a second number of slots, and the PUCCH transmission overlaps with the PUSCH transmission in one or more slots, and the conditions for multiplexing UCI to PUSCH are satisfied in the overlapping slot, the UE transmits PUCCH in the overlapping slot and does not transmit PUSCH.

Hereinafter, in the case of performing PUSCH TB mapping to multiple slots (multi-slot TB mapping) to improve coverage of the UE, a method of determining the number of UCI REs when multiplexing UCI to PUSCH and transmitting is proposed.

Hereinafter, PUSCH repetitions (TB repetitions) will be described on the assumption that PUSCH repetition type A is applied. In addition, it is assumed that the PUSCH is transmitted by applying multi-slot TB mapping, in which one PUSCH TB is mapped to a plurality of slot resources and transmitted. For convenience, this PUSCH is referred to as a TB processing over multi-slot (TBoMS) PUSCH.

A plurality of slots to which a TB is mapped may be configured as slots continuously or non-continuously located on the time axis. When a TB is mapped to a plurality of slots, it means that the TB is mapped to all or some symbol resources located in the corresponding slots. In this case, slot resources to which one TB is mapped may be referred to as a transmission occasion of the TB. One TB may perform continuous rate-matching on resources within a plurality of slots constituting a transmission occasion.

While applying multi-slot TB mapping to PUSCH transmission, repetition may also be applied for additional coverage enhancement. If PUSCH TB repetitions are performed K times, TB is repeatedly transmitted K times through K transmission occasions.

Figure 11:
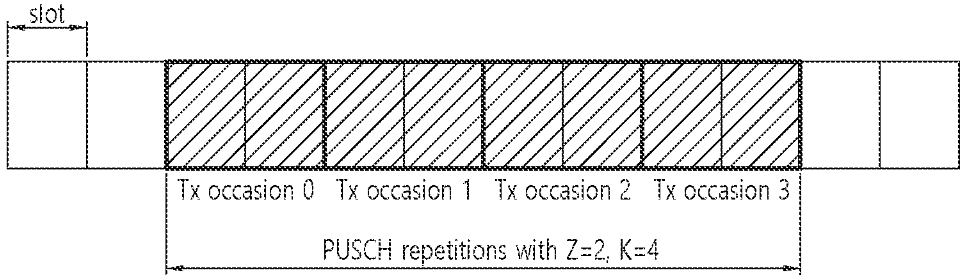
FIG. 11 illustrates a case in which TBoMS PUSCH transmission is repeated.

FIG. 11 illustrates a case where multi-slot TB mapping and repetition are applied to PUSCH transmission.

Referring to FIG. 11, for example, slot resources to which one TB is mapped may consist of Z=2 slots, and the TB may be repeatedly transmitted K=4 times. As shown in FIG. 11, each transmission occasion of TB repetition is composed of Z=2 slots, and transmitted repeatedly K=4 times through the $0^{th}$ transmission occasion to the $3^{rd}$ transmission occasion.

In the prior art, when transmission time resources of PUSCH and PUCCH without repetition overlap in a specific slot, UCI is piggybacked on PUSCH and transmitted. However, when PUSCH TB is mapped over multiple slots, predicting PUCCH transmission in which overlap will occur during a slot resource period in which PUSCH TB is transmitted in advance and rate-matching for code blocks (CBs) transmitted through the PUSCH should be performed. Such operations may be difficult to perform when considering UE processing time or a UCI multiplexing procedure.

Figure 12:
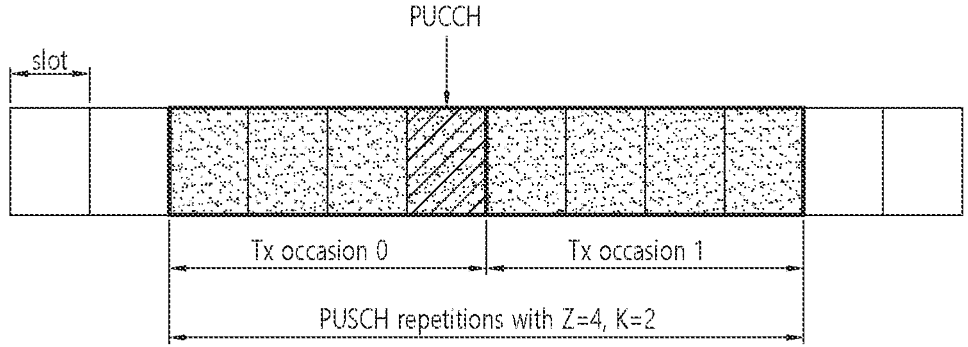
FIG. 12 illustrates a case in which a PUSCH to which multi-slot TB mapping and repetition are applied and a PUCCH overlap.

FIG. 12 illustrates a case in which a PUSCH to which multi-slot TB mapping and repetition are applied and a PUCCH overlap.

Referring to FIG. 12, a TB of PUSCH may be mapped through Z=4 slots and transmitted repeatedly K=2 times in total. In this case, when the UE has already started transmission on PUSCH transmission occasion #0, PUCCH transmission may be scheduled in the last slot of transmission occasion #0. In this case, the UE cannot perform PUCCH piggyback to the PUSCH.

PUSCH repetition may not be performed when TBoMS PUSCH is transmitted. In this case, when Z, the number of slots to which PUSCH TBs are mapped, is greater than 1, K, the number of repetitions of PUSCH TBs, may always be equal to 1.

Only one transmission occasion may exist in a time interval in which one TB is mapped to multiple slots. Alternatively, a plurality of transmission occasions may exist within a time interval in which one TB is mapped to multiple slots. When a plurality of transmission occasions may exist within a time interval in which one TB is mapped to multiple slots, the transmission time resource of the TBoMS PUSCH in the present disclosure may mean 1) the entire time interval in which one TB is mapped to multiple slots or 2) one transmission occasion. That is, TBoMS PUSCH, TBoMS PUSCH transmission, and TBoMS PUSCH transmission resources in the present disclosure may be replaced with transmission occasion of TBoMS PUSCH, transmission of transmission occasion of TBoMS PUSCH, and transmission occasion transmission resource of TBoMS PUSCH, respectively.

When performing multi-slot TB mapping for PUSCH transmission and applying repetition at the same time, a UE operation when overlapping of PUSCH transmission and PUCCH transmission time resources occurs is proposed.

The content of the present disclosure can be applied only when the PUCCH is transmitted without performing repetition, that is, when the number of repetitions $N^{repeat}_{PUCCH}$ of the PUCCH is 1.

Conventionally, when UCI is transmitted on PUSCH, the number of coded modulation symbols per layer of UCI, that is, the number of REs through which UCI is transmitted, can be determined by the following equations.

First, when UCI is HARQ-ACK, the number of REs may be determined as in the following equation.

[Equation 1]

$$Q'_{ACK} = \min\left\{\left\lceil \frac{(O_{ACK}+L_{ACK})\cdot\beta^{PUSCH}_{offset}\cdot\sum_{l=0}^{N^{PUSCH}_{symb,all}-1} M^{UCI}_{sc}(l)}{\sum_{r=0}^{C_{UL-SCH}-1} K_r}\right\rceil, \left\lceil \alpha\cdot\sum_{l=l_0}^{N^{PUSCH}_{symb,all}-1} M^{UCI}_{sc}(l)\right\rceil\right\}$$

-continued

Here, $O_{ACK}$ is the number of HARQ-ACK bits. If $O_{ACK}$ is 36) or more, $L_{ACK}$ is 11, otherwise $L_{ACK}$ is the number of CRC bits for HARQ-ACK. ($O_{ACK}$+$L_{ACK}$) may be referred to as the payload size of UCI.

$\beta^{PUSCH}_{offset}$ is $\beta H^{ARQ-ACK}_{offset}$.

$C_{UL-SCH}$ is the number of code blocks for UL-SCH of PUSCH transmission.

If the DCI format scheduling the PUSCH transmission includes a CBGTI (Code block group transmission information) field indicating that the UE shall not transmit the r-th code block, $K_r$=0, otherwise, $K_r$ is the r-th code block size for UL-SCH of the PUSCH transmission.

$M^{PUSCH}_{sc}$ is the scheduled bandwidth of a PUSCH transmission, expressed as the number of subcarriers.

$M^{PT\text{-}RS}_{sc}(1)$ is the number of subcarriers in OFDM symbol 1 that carries PTRS (Phase Tracking Reference signal), in the PUSCH transmission.

$M^{UCI}_{sc}(1)$ is the number of resource elements that can be used for transmission of UCI in OFDM symbol 1, for 1=0, 1, 2, . . . , $N^{PUSCH}_{symb,all}$−1, in the PUSCH transmission. $N^{PUSCH}_{symb,all}$ is the total number of OFDM symbols of the PUSCH, including all OFDM symbols used for DMRS.

For any OFDM symbol that carries the DMRS of PUSCH, $M^{UCI}_{sc}(1)$=0, for any OFDM symbol that does not carry DMRS of the PUSCH, $M^{UCI}_{sc}(1)$ $M^{PUSCH}_{sc}$−$M^{PT\text{-}RS}_{sc}(1)$.

α is set by a higher layer parameter ‘scaling’.

$1_0$ is the symbol index of the first OFDM symbol that does not carry DMRS of the PUSCH, after the first DMRS symbol(s), in the PUSCH transmission.

If UCI is CSI part 1, the number of REs may be determined as follows.

[Equation 2]

$$Q'_{CSI-1} = \min\left\{\left\lceil \frac{(O_{CSI-1}+L_{CSI-1})\cdot\beta^{PUSCH}_{offset}\cdot\sum_{l=0}^{N^{PUSCH}_{symb,all}-1} M^{UCI}_{sc}(l)}{\sum_{r=0}^{C_{UL-SCH}-1} K_r}\right\rceil, \left\lceil \alpha\cdot\sum_{l=0}^{N^{PUSCH}_{symb,all}-1} M^{UCI}_{sc}(l)\right\rceil - Q'_{ACK/CG-UCI}\right\}$$

$O_{CSI-1}$ is the number of bits of CSI part 1. If $O_{CSI-1}$ is 360 or more, $L_{CSI-1}$ is 11, otherwise $L_{CSI-1}$ is the number of CRC bits for CSI part 1.

$\beta^{PUSCH}_{offset}$ is $\beta^{CSI\text{-}part1}_{offtset}$.

$C_{UL-SCH}$ is the number of code blocks for UL-SCH of PUSCH transmission.

If the DCI format scheduling the PUSCH transmission includes a CBGTI (Code block group transmission information) field indicating that the UE shall not transmit the r-th code block, $K_r$=0, otherwise, $K_r$ is the r-th code block size for UL-SCH of the PUSCH transmission.

$M^{PuscH}_{sc}$, is the scheduled bandwidth of a PUSCH transmission, expressed as the number of subcarriers.

$M^{PT\text{-}RS}_{sc}(1)$ is the number of subcarriers in OFDM symbol 1 that carries PTRS (Phase Tracking Reference signal), in the PUSCH transmission.

If HARQ-ACK is present on PUSCH and without CG-UCI, $Q'_{ACK/CG\text{-}UCI}=Q'_{ACK}$. $Q'_{ACK}$ is the number of coded modulation symbols per layer for HARQ-ACK transmitted on the PUSCH if number of HARQ-ACK information bits is more than 2. If the number of HARQ-ACK information bits is 2 or less. $Q'_{ACK}$ is given as $$Q'_{ACK} = \sum_{l=0}^{N_{symb,all}^{PUSCH}-1} \overline{M}_{sc,rvd}^{ACK}(l).\ \overline{M}_{sc,rvd}^{ACK}(l)$$

is the number of reserved resource elements for potential HARQ-ACK transmission in OFDM symbol 1 in the PUSCH transmission. 1=0, 1, 2, . . . , $N^{PUSCH}_{symb,all}-1$.

If both HARQ-ACK and CG-UCI are present on the same PUSCH, $Q'_{ACK/CG\text{-}UGI}=Q'_{ACK}$. Here, $Q'_{ACK}$ is the number of coded modulation symbols per layer for HARQ-ACK and CG-UCI transmitted on the PUSCH.

If CG-UCI is present on the PUSCH and without HARQ-ACK, $Q'_{ACK/CG\text{-}UGI}=Q'_{CG\text{-}UCI}$. Here, $Q'_{CG\text{-}UCI}$ is the number of coded modulation symbols per layer for CG-UCI transmitted on the PUSCH.

$M^{UCI}_{sc}(1)$ is the number of resource elements that can be used for transmission of UCI in OFDM symbol 1, for 1=0, 1, 2, . . . , $N^{PUSCH}_{symb,all}-1$, in the PUSCH transmission. $N^{PUSCH}_{symb,all}$ is the total number of OFDM symbols of the PUSCH, including all OFDM symbols used for DMRS.

For any OFDM symbol that carries DMRS of PUSCH, $M^{UCI}_{sc}(1)=0$

For any OFDM symbol that does not carry DMRS of PUSCH, $M^{UCI}_{sc}(1)=M^{PUSCH}_{sc}-M^{PT\text{-}RS}_{sc}(1)$.

α is configured by a higher layer parameter 'scaling'.

If UCI is CSI part 2, the number of REs may be determined as follows.

[Equation 3]

$$Q'_{CSI-2} = \min\left\{\left\lceil\frac{(O_{CSI-2}+L_{CSI-2})\cdot\beta_{offset}^{PUSCH}\cdot\sum_{l=0}^{N_{symb,all}^{PUSCH}-1}M_{sc}^{UCI}(l)}{\sum_{r=0}^{C_{UL-SCH}-1}K_r}\right\rceil,\ \left\lceil\alpha\cdot\sum_{l=0}^{N_{symb,all}^{PUSCH}-1}M_{sc}^{UCI}(l)\right\rceil - Q'_{ACK/CG-UCI} - Q'_{CSI-1}\right\}$$

$O_{CSI\text{-}2}$ is the number of bits of CSI part 2. If $O_{CSI\text{-}2}$ is 360 or more, $L_{CSI\text{-}2}$ is 11, otherwise $L_{CSI\text{-}2}$ is the number of CRC bits for CSI part 2.

$\beta^{PUSCH}_{offset}$ is $\beta^{CSI\text{-}part2}_{offset}$.

$C_{UL\text{-}SCH}$ is the number of code blocks for UL-SCH of PUSCH transmission.

If the DCI format scheduling the PUSCH transmission includes a CBGTI (Code block group transmission information) field indicating that the UE shall not transmit the r-th code block, $K_r=0$, otherwise, $K_r$ is the r-th code block size for UL-SCH of the PUSCH transmission.

$M^{PUSCH}_{sc}$ is the scheduled bandwidth of a PUSCH transmission, expressed as the number of subcarriers.

$M^{PT\text{-}RS}_{sc}(1)$ is the number of subcarriers in OFDM symbol 1 that carries PTRS, in the PUSCH transmission.

If HARQ-ACK is present on PUSCH and without CG-UCI, $Q'_{ACK/CG\text{-}UGI}=Q'_{ACK}$. Here, $Q'_{ACK}$ is the number of coded modulation symbols per layer for HARQ-ACK transmitted on the PUSCH if number of HARQ-ACK information bits is more than 2. If the number of HARQ-ACK information bits is 1 or 2, $Q'_{ACK}=0$.

If both HARQ-ACK and CG-UCI are present on the same PUSCH, $Q'_{ACK/CG\text{-}UGI}=Q'_{ACK}$. Here, $Q'_{ACK}$ is the number of coded modulation symbols per layer for HARQ-ACK and CG-UCI transmitted on the PUSCH.

If CG-UCI is present on the PUSCH and without HARQ-ACK. $Q'_{ACK/CG\text{-}UGI}=Q'_{CG\text{-}UCI}$. Here, Q'CG-UCI is the number of coded modulation symbols per layer for CG-UCI transmitted on the PUSCH.

$Q'_{CSI\text{-}1}$ is the number of coded modulation symbols per layer for CSI-part 1 transmitted on the PUSCH.

$M^{UCI}_{sc}(1)$ is the number of resource elements that can be used for UCI transmission in OFDM symbol 1 in PUSCH transmission, 1=0, 1, 2, . . . $N^{PUSCH}_{symb,all}$-1. $N^{PUSCH}_{symb,all}$ is the total number of OFDM symbols of the PUSCH, including all OFDM symbols used for DMRS.

For any OFDM symbol that carries DMRS of PUSCH, $M^{UCI}_{sc}(1)=0$.

For any OFDM symbol that does not carry DMRS of PUSCH, $M^{UCI}_{sc}(1)=M^{PUSCH}_{sc}-M^{PT\text{-}RS}_{sc}(1)$.

α is configured by a higher layer parameter 'scaling'.

If UCI is CG-UCI, the number of REs may be determined as follows.

[Equation 4]

$$Q'_{CG-UCI} = \min\left\{\left\lceil\frac{(O_{CG-UCI}+L_{CG-UCI})\cdot\beta_{offset}^{PUSCH}\cdot\sum_{l=0}^{N_{symb,all}^{PUSCH}-1}M_{sc}^{UCI}(l)}{\sum_{r=0}^{C_{UL-SCH}-1}K_r}\right\rceil,\ \left\lceil\alpha\cdot\sum_{l=l_0}^{N_{symb,all}^{PUSCH}-1}M_{sc}^{UCI}(l)\right\rceil\right\}$$

$O_{CG\text{-}UCI}$ is the number of bits of CG-UCI.

$L_{CG\text{-}UCI}$ is the number of CRC bits for CG-UCI.

$\beta^{PUSCH}_{offset}$ is $\beta^{CG\text{-}UCI}_{offset}$.

$C_{UL\text{-}SCH}$ is the number of code blocks for UL-SCH of PUSCH transmission.

$K_r$ is the r-th code block size for the UL-SCH of PUSCH transmission.

$M^{PUSCH}_{sc}$ is the scheduled bandwidth of a PUSCH transmission, expressed as the number of subcarriers.

$M^{PT\text{-}RS}_{sc}(1)$ is the number of subcarriers of OFDM symbol 1 carrying PTRS in PUSCH transmission.

$M^{UCI}_{sc}(1)$ is the number of resource elements that can be used for UCI transmission in OFDM symbol 1 in PUSCH transmission, $l=0, 1, 2, \ldots, N^{PUSCH}_{symb,all}-1$. $N^{PUSCH}_{symb,all}$ is the total number of OFDM symbols of the PUSCH, including all OFDM symbols used for DMRS.

For any OFDM symbol that carries DMRS of PUSCH, $M^{UCI}_{sc}(l)=0$.

For any OFDM symbol that does not carry DMRS of PUSCH, $M^{UCI}_{sc}(l)=M^{PUSCH}_{sc}-M^{PT\text{-}RS}_{sc}(l)$.

$\alpha$ is configured by a higher layer parameter 'scaling'.

$l_0$ is the symbol index of the first OFDM symbol that does not carry DMRS of the PUSCH, after the first DMRS symbol(s), in the PUSCH transmission.

The input bit sequence for rate matching is $d_{r0}$, $d_{r1}$, $d_{r2}$, $d_{r3}$, . . . , $d_r(N_{r-1})$. Here, r is the code block number and $N_r$ is the number of coded bits in code block number r.

$I_{BIL}=1$ is set and rate matching is performed. The length of the rate matching output sequence is $E_r=\text{floor}(E_{UCI}/C_{UCI})$. Here, $C_{UCI}$ is the number of code blocks for UCI. $N_L$ is the number of transmission layers of PUSCH. $Q_m$ is the modulation order of PUSCH.

$$E_{UCI}=N_L \cdot Q'_{CG\text{-}UCI} \cdot Q_m.$$

When UCI is HARQ-ACK and CG-UCI, the number of REs may be determined as follows.

[Equation 5]

$$Q'_{ACK} = \min\left\{\left\lceil \frac{(O_{ACK}+O_{CG\text{-}UGI}+L_{ACK})\cdot \beta^{PUSCH}_{offset}\cdot \sum_{l=0}^{N^{PUSCH}_{symb,all}-1} M^{UCI}_{sc}(l)}{\sum_{r=0}^{C_{UL\text{-}SCH}-1} K_r}\right\rceil, \left\lceil \alpha \cdot \sum_{l=l_0}^{N^{PUSCH}_{symb,all}-1} M^{UCI}_{sc}(l)\right\rceil\right\}$$

$O_{ACK}$ is the number of bits of HARQ-ACK.

$O_{CG\text{-}UCI}$ is the number of bits of CG-UCI.

If $O_{ACK}+O_{CG\text{-}UCI}$ is greater than 360, $L_{ACK}$ is 11, otherwise $L_{ACK}$ is the number of CRC bits for HARQ-ACK and CG-UCI.

$\beta^{PUSCH}_{offset}$ is $\beta^{HARQ\text{-}ACK}_{offset}$.

$C_{UL\text{-}SCH}$ is the number of code blocks for UL-SCH of PUSCH transmission.

$K_r$ is the r-th code block size for the UL-SCH of PUSCH transmission.

$M^{PUSCH}_{sc}$ is the scheduled bandwidth of a PUSCH transmission, expressed as the number of subcarriers.

$M^{PT\text{-}RS}_{sc}(l)$ is the number of subcarriers of OFDM symbol l carrying PTRS in PUSCH transmission.

$M^{UCI}_{sc}(l)$ is the number of resource elements that can be used for UCI transmission in OFDM symbol l in PUSCH transmission, $l=0, 1, 2, \ldots, N^{PUSCH}_{symb,all}-1$. $N^{PUSCH}_{symb,all}$ is the total number of OFDM symbols of the PUSCH, including all OFDM symbols used for DMRS.

For any OFDM symbol that carries DMRS of PUSCH, $M^{UCI}_{sc}=0$

For any OFDM symbol that does not carry DMRS of PUSCH, $M^{UCI}_{sc}(l)=M^{PUSCH}_{sc}-M^{PT\text{-}RS}_{sc}(l)$.

$\alpha$ is configured by a higher layer parameter 'scaling'.

$l_0$ is the symbol index of the first OFDM symbol that does not carry DMRS of the PUSCH, after the first DMRS symbol(s), in the PUSCH transmission.

It can be seen that equations for determining the number of UCI transmission REs according to the UCI type (that is, equations 1 to 5) are commonly configured in the form of min {A, B}.

Here, part A (term A in min {A, B}), which is the left term in the above equations, can be said to be a part for determining the number of transmission REs of UCI based on the code rate of PUSCH. That is, the number of transmission REs of UCI( ) is obtained based on 1 number of transmission REs of PUSCH $$\left(\text{e.g., } \sum_{l=0}^{N^{PUSCH}_{symb,all}-1} M^{UCI}_{sc}(l) \text{ in equation 1}\right)$$

number of transmission bits of PUSCH $$\left(\text{e.g., } \sum_{r=0}^{C_{UL\text{-}SCH}-1} K_r \text{ in equation 1}\right)'$$

and 'UCI payload size'(e.g., $O_{ACK}+L_{ACK}$ in equation 1).

At this time, the number of transmission REs of UCI is scaled by the offset value of $\beta^{PUSCH}_{offset}$. Specifically, an offset value for determining the number of resources for a UE to multiplex HARQ-ACK information on a PUSCH and multiplex a CSI report is defined. An offset value for multiplexing CG-UCI in CG-PUSCH is also defined. The offset value may be signaled to the UE by a DCI format for scheduling PUSCH transmission or a higher layer signal. The $\beta^{PUSCH}_{offset}$ value may differ depending on the UCI type, and the values of $\beta^{HARQ\text{-}ACK}_{offset}$, and $\beta^{CSI\text{-}part1}_{offset}$, and $\beta^{CSI\text{-}part2}_{offset}$ are applied to the UCI types of HARQ-ACK. CSI part 1, and CSI part 2, respectively.

Part B (term B in min {A, B}), which is the right term in the above equations, is a part for setting the upper bound of the number of UCI transmission REs, and it may serve to limit the number of UCI transmission REs so that it does not exceed a 'the number of transmission REs of PUSCH'. This $\alpha$ value is set by a higher layer parameter 'scaling'.

Since the existing PUSCH was transmitted through symbol resources within one slot, in Equations 1 to 5, $N^{PUSCH}_{symb,all}$, which means the number of PUSCH transmission symbols, does not exceed the number of symbols constituting a slot.

On the other hand, in the case of TBoMS PUSCH transmission, symbols constituting one TBoMS PUSCH transmission exist over a plurality of slot resources. In addition, w % ben a collision between the TBoMS PUSCH and the PUCCH occurs, it may be considered that UCI multiplexing is performed within one slot resource in which an overlap occurs. In this case, it is necessary not only to clarify the meaning of $N^{PUSCH}_{symb,all}$ in the equations for obtaining the UCI transmission RE, but also to change Equations 1 to 5. This will be explained below.

Figure 13:
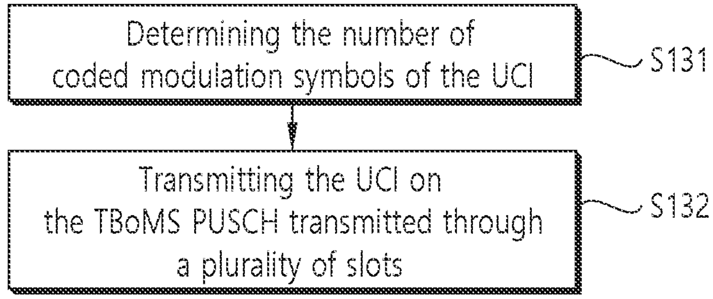
FIG. 13 illustrates a method in which a UE transmits uplink control information (UCI) in a wireless communication system.

FIG. 13 illustrates a method in which a UE transmits uplink control information (UCI) in a wireless communication system.

Referring to FIG. 13, the UE determines the number of coded modulation symbols of the UCI (S131). Specifically, the number of coded modulation symbols for the case of transmitting UCI through TBoMS PUSCH is determined.

The number of the coded modulation symbols of the UCI is determined based on i) a value obtained by multiplying the sum of the number of resource elements that can be used for transmission of the UCI in OFDM symbols from symbol index 0 to $N^{PUSCH}_{symb,all}-1$ in one slot with the UCI transmission among the plurality of slots by the number (Z) of slots configured for the TBoMS PUSCH and ii) the total number of bits transmitted through the TBoMS PUSCH. And the $N^{PUSCH}_{symb,all}$ is determined to mean the total number of OFDM symbols of the PUSCH in the one slot.

The UE transmits the UCI on the TBoMS PUSCH transmitted through a plurality of slots (S132). The UCI may include HARQ-ACK (Hybrid Automatic Repeat and request-Acknowledgment).

The number of slots (Z) may be indicated by downlink control information (DCI). For example, Z may be a 'numberOfSlotsTBoMS' value in a specific row of a resource allocation table indicated by a time domain resource assignment (TDRA) field of DCI.

Based on a collision between transmission of a physical uplink control channel (PUCCH) and transmission of the TBoMS PUSCH in the one slot, the UCI may be transmitted through the TBoMS PUSCH.

Method 1. As described in FIG. 13, in the equation for obtaining the number of UCI transmission REs (ie, Equations 1 to 5), $N^{PUSCH}_{symb,all}$ may mean the number of TBoMS PUSCH transmission symbols in one slot.

In this case, since $$\sum_{r=0}^{C_{UL-SCH}-1} K_r$$

means the total number of bits constituting the TBoMS PUSCH transmission, $$\sum_{l=0}^{N^{PUSCH}_{symb,all}-1} M^{UCI}_{sc}(l) / \sum_{r=0}^{C_{UL-SCH}-1} K_r$$

in the above term A does not correctly reflect the actual code rate of TBoMS PUSCH (since the numerator is the number of resource elements based on one slot but the denominator is the number of bits transmitted in all of the plurality of slots constituting the TBoMS PUSCH).

To solve this problem, the term A may be multiplied by the Z value. More specifically, in the numerator of the term A of Equations 1 to 5, $$\beta^{PUSCH}_{offset} \cdot \sum_{l=0}^{N^{PUSCH}_{symb,all}-1} M^{UCI}_{sc}(l)$$

can be changed to $$\beta^{PUSCH}_{offset} \cdot Z \cdot \sum_{l=0}^{N^{PUSCH}_{symb,all}-1} M^{UCI}_{sc}(l).$$

In this case. Z may mean the number of slots through which the TBoMS PUSCH is transmitted. Specifically, Z may mean the number of slots constituting a TBoMS PUSCH transmission occasion, and may mean the number of slots constituting TBoMS PUSCH transmission indicated through RRC/DCI from the network.

In an equivalent sense to multiplying the numerator of the term A by Z, 1/Z may be multiplied by the denominator of the term A. That is, instead of multiplying the numerator of the term A by Z, the denominator of the term A may be multiplied by 1/Z. In this case, the number of coded modulation symbols per layer of UCI when UCI is transmitted on the PUSCH, that is, the number of REs through which UCI is transmitted may be determined as the below equation.

[Equation 6]

$$Q'_{ACK} = \min\left\{\left\lceil \frac{(O_{ACK}+L_{ACK})\cdot\beta^{PUSCH}_{offset}\cdot\sum_{l=0}^{N^{PUSCH}_{symb,all}-1} M^{UCI}_{sc}(l)}{\frac{1}{Z}\sum_{r=0}^{C_{UL-SCH}-1} K_r}\right\rceil, \left\lceil \alpha\cdot\sum_{l=l_0}^{N^{PUSCH}_{symb,all}-1} M^{UCI}_{sc}(l)\right\rceil\right\}$$

Equation 7 illustrates the case where UCI is CSI part1.

[Equation 7]

$$Q'_{CSI-1} = \min\left\{\left\lceil \frac{(O_{CSI-1}+L_{CSI-1})\cdot\beta^{PUSCH}_{offset}\cdot\sum_{l=0}^{N^{PUSCH}_{symb,all}-1} M^{UCI}_{sc}(l)}{\frac{1}{Z}\sum_{r=0}^{C_{UL-SCH}-1} K_r}\right\rceil, \left\lceil \alpha\cdot\sum_{l=0}^{N^{PUSCH}_{symb,all}-1} M^{UCI}_{sc}(l)\right\rceil - Q'_{ACK/CG-UCI}\right\}$$

Equation 8 illustrates the case where UCI is CSI part2.

[Equation 8]

$$Q'_{CSI-2} = \min\left\{\left\lceil \frac{O_{CSI-2}+L_{CSI-2})\cdot\beta^{PUSCH}_{offset}\cdot\sum_{l=0}^{N^{PUSCH}_{symb,all}-1} M^{UCI}_{sc}(l)}{\frac{1}{z}\sum_{r=0}^{C_{UL-SCH}-1} K_r}\right\rceil, \left\lceil \alpha\cdot\sum_{l=0}^{N^{PUSCH}_{symb,all}-1} M^{UCI}_{sc}(l)\right\rceil - Q'_{ACK/CG-UCI} - Q'_{CSI-1}\right\}$$

Equation 9 illustrates the case where UCI is CG-UCI.

[Equation 9]

$$Q'_{CG-UCI} = \min\left\{\left\lceil \frac{(O_{CG-UCI}+L_{CG-UCI})\cdot\beta^{PUSCH}_{offset}\cdot\sum_{l=0}^{N^{PUSCH}_{symb,all}-1} M^{UCI}_{sc}(l)}{\frac{1}{z}\sum_{r=0}^{C_{UL-SCH}-1} K_r}\right\rceil,\right.$$

-continued $$\left.\left\lceil \alpha \cdot \sum_{l=l_0}^{N_{symb,all}^{PUSCH}-1} M_{sc}^{UCI}(l) \right\rceil\right\}$$

Equation 10 illustrates the case where UCI is HARQ-ACK and CG-UCI.

$$Q'_{ACK} = \min\left\{\left\lceil \frac{(O_{ACK} + O_{CG-UCI} + L_{ACK}) \cdot \beta_{offset}^{PUSCH} \cdot \sum_{l=0}^{N_{symb,all}^{PUSCH}-1} M_{sc}^{UCI}(l)}{\frac{1}{z}\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil\right\} \quad \text{[Equation 10]}$$

Each parameter of Equations 6 to 10 has already been described in Equations 1 to 5.

In Equations 6 to 10, to obtain the number of UCI transmission resource elements, the number of transmission symbols of PUSCH ($N^{PUSCH}_{symb,all}$) means the number of transmission symbols of TBoMS within one slot in which UCI is transmitted. In addition, the sum of $K_r$, which means the number of bits constituting code blocks transmitted through TBoMS, is divided by the number of TBoMS transmission slots (Z) and applied. According to Equations 6 to 10, the number of REs (number of modulation symbols) required for UCI transmission in a TBoMS PUSCH transmitted over a plurality of slots can be correctly calculated. Therefore, the UE can determine the number of UCI transmission REs according to the performance targeted by the base station.

Meanwhile, for the case where UCI is transmitted through TBoMS PUSCH, the $\beta^{PUSCH}_{offset}$ value may have a larger value than before. In the prior art, when a beta_offset value is set to a UE through a higher layer signal, the values of $\beta^{HARQ\text{-}ACK}_{offset}$, $\beta^{CSI\text{-}part1}_{offset}$, and $\beta^{CSI\text{-}part2}_{offset}$ corresponding to the beta_offset value are defined in a table. $\beta^{HARQ\text{-}ACK}_{offset}$, $\beta^{CSI\text{-}part1}_{offset}$, and $\beta^{CSI\text{-}part2}_{offset}$ values that are larger than previously available values may be mapped using a reserved field of the corresponding mapping table.

Alternatively, when UCI is transmitted on TBoMS PUSCH, $\beta^{PUSCH}_{offset}$ can be defined/configured separately from the $\beta^{PUSCH}_{offset}$ value used when UCI is transmitted on the existing PUSCH. In the prior art, when a beta_offset value is set for a UE through a higher layer signal, the values of $\beta^{HARQ\text{-}ACK}_{offset}$, $\beta^{CSI\text{-}part1}_{offset}$, and $\beta^{CSI\text{-}part2}_{offset}$ corresponding to the corresponding beta_offset value are defined in a table. When UCI is transmitted through TBoMS PUSCH, an independent mapping table can be defined and applied. In this case, the independent mapping table may be designed to have larger values of $\beta^{HARQ\text{-}ACK}_{offset}$, $\beta^{CSI\text{-}part1}_{offset}$, and $\beta^{CSI\text{-}part2}_{offset}$ than the existing mapping table.

Considering that TBoMS PUSCH is performed for the purpose of coverage enhancement, when UCI is transmitted through TBoMS PUSCH, UCI transmission may also need to be transmitted at a lower code rate using more RE resources. To this end, in order to prevent the number of UCI transmission REs from being limited to too small a number by $$\alpha \cdot \sum_{l=0}^{N_{symb,all}^{PUSCH}-1} M_{sc}^{UCI}(l)$$

of the term B, an independent value of a may be defined/configured when UCI is transmitted on TBoMS PUSCH. That is, the α value applied when UCI is multiplexed and transmitted on the TBoMS PUSCH may be defined/set independently of the existing α value.

Method 2. In the equation for obtaining the number of UCI transmission REs, $N^{PUSCH}_{symb,all}$ may mean the number of symbols in all slots through which the TBoMS PUSCH is transmitted.

In this case, $$\sum_{l=0}^{N_{symb,all}^{PUSCH}-1} M_{sc}^{UCI}(l) / \sum_{r=0}^{C_{UL-SCH}-1} K_r$$

may reflect the actual code rate of the PUSCH.

On the other hand, $$\alpha \cdot \sum_{l=0}^{N_{symb,all}^{PUSCH}-1} M_{sc}^{UCI}(l)$$

may exceed the number of REs constituting one slot. In order to prevent this phenomenon, $$\alpha \cdot \sum_{l=0}^{N_{symb,all}^{PUSCH}-1} M_{sc}^{UCI}(l)$$

in the term B of the above equations can be changed to a $$\alpha / Z \cdot \sum_{l=0}^{N_{symb,all}^{PUSCH}-1} M_{sc}^{UCI}(l).$$

In this case, Z may mean the number of slots through which the TBoMS PUSCH is transmitted.

Alternatively, in the term B of the above equations, $$\alpha \cdot \sum_{l=0}^{N_{symb,all}^{PUSCH}-1} M_{sc}^{UCI}(l)$$

may be changed to $$\min\left(\alpha \cdot \sum_{l=0}^{N_{symb,all}^{PUSCH}-1} M_{sc}^{UCI}(l),\ 1/Z \cdot \sum_{l=0}^{N_{symb,all}^{PUSCH}-1} M_{sc}^{UCI}(l)\right).$$

This is to prevent α

$$\sum_{l=0}^{N_{symb,all}^{PUSCH}-1} M_{sc}^{UCI}(l)$$

from exceeding the number of PUSCH REs in one slot. In this case, Z may mean the number of slots through which the TBoMS PUSCH is transmitted.

Method 3. In the equation for obtaining the number of UCI transmission REs, $N^{PUSCH}_{symb,all}$ may be defined differently for the term A and the term B.

For example, $N^{PUSCH}_{symb,all}$ in term A of the above equation may mean the number of symbols in all slots through which the TBoMS PUSCH is transmitted.

On the other hand, $N^{PUSCH}_{symb,all}$ in term B of the above equation may mean the number of TBoMS PUSCH transmission symbols in one slot.

In the case of TBoMS PUSCH transmission, TBoMS PUSCH transmission may be performed using the same number of symbols for each slot in which TBoMS PUSCH transmission is performed or the number of symbols used for TBoMS PUSCH transmission may be different for each slot in which TBoMS PUSCH transmission is performed. Considering this, $N^{PUSCH}_{symb,all}$ may be defined as follows.

When $N^{PUSCH}_{symb,all}$ means the number of PUSCH transmission symbols in one slot, more specifically. $N^{PUSCH}_{symb,all}$ may be defined as follows.

1) It may mean the number of symbols (including DMRS symbol(s)) in which actual TBoMS PUSCH transmission is performed in a slot in which UCI multiplexing is performed.
2) It may mean the number of PUSCH transmission symbols (=L) indicated through the TDRA field of DCI.

When $N^{PUSCH}_{symb,all}$ means the number of symbols in all slots through which the TBoMS PUSCH is transmitted, more specifically, $N^{PUSCH}_{symb,all}$ may be defined as follows.

1) It may mean the number of symbols (including DMRS symbol(s)) through which actual TBoMS PUSCH transmission is performed in slots in which the TBoMS PUSCH is transmitted.
2) When the number of PUSCH transmission symbols indicated through the TDRA field of DCI is L and the number of slots through which TBoMS PUSCH is transmitted is Z, it may mean 'Z×L'.

At this time, the number Z of slots through which the TBoMS PUSCH is transmitted may be replaced as follows.

i) It may mean the number of transmission slots of TBoMS PUSCH. In this case, it may mean the number of slots constituting TBoMS PUSCH transmission indicated through RRC/DCI from the network, not the actual number of transmission slots of TBoMS PUSCH.
ii) It may mean the number of slots constituting a TBoMS PUSCH transmission occasion. In this case, it may mean the number of slots constituting the transmission occasion indicated through RRC/DCI from the network, not the number of slots constituting the actual transmission occasion.
iii) To calculate the size of the TB transmitted through the TBoMS PUSCH, $N_{info}=S*N_{RE}*R*Q_m*v$ is determined, where S may mean a scaling factor. In this case, Z may mean a corresponding scaling factor S.

Figure 14:
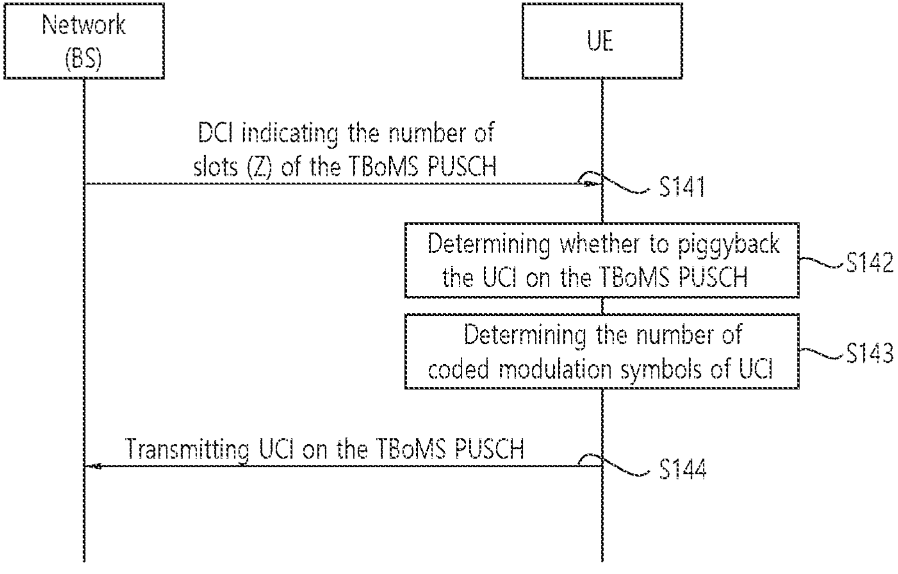
FIG. 14 is an example of an operation between a network (base station) and a UE.

FIG. 14 is an example of an operation between a network (base station) and a UE.

Referring to FIG. 14, the base station provides DCI indicating the number of slots (Z) of the TBoMS PUSCH to the UE (S141).

For example, the Z value may be informed through a 'numberOfSlotsTBoMS' value in a specific row of a resource allocation table indicated by a time domain resource assignment (TDRA) field of DCI.

The UE determines whether to piggyback the UCI on the TBoMS PUSCH (S142). For example, if a collision with PUCCH transmission occurs in some of the slots constituting TBoMS PUSCH transmission, it may be determined that UCI is piggybacked and transmitted on the TBoMS PUSCH in the corresponding slot.

The UE determines the number of coded modulation symbols of UCI (S143). The UE may determine the number of coded modulation symbols of the UCI by any one of Equations 6 to 10 described above.

The UE transmits UCI on the TBoMS PUSCH (S144).

If a PUSCH transmitted in a single slot, that is, a case in which a collision occurs between an existing PUSCH and a PUCCH, the number of coded modulation symbols of UCI may be determined according to any one of Equations 1 to 5.

Figure 15:
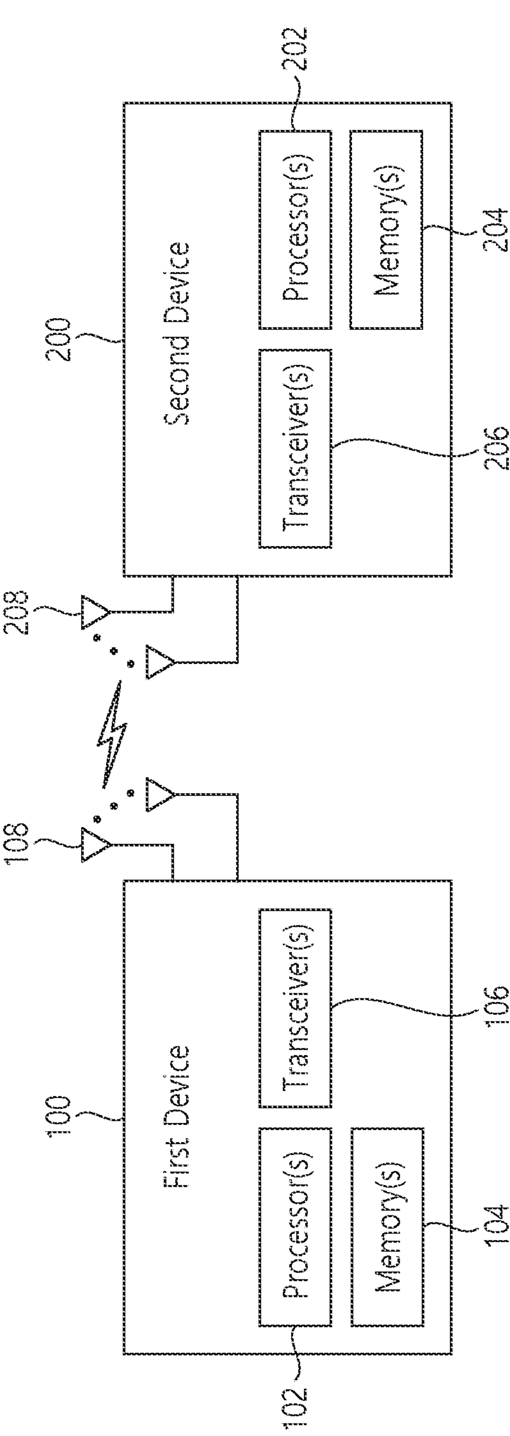
FIG. 15 illustrates a wireless device applicable to this specification.

FIG. 15 illustrates a wireless device applicable to this specification.

Referring to FIG. 15, the first wireless device 100 and the second wireless device 200 may transmit/receive wireless signals through various wireless access technologies (e.g., LTE, NR).

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In this specification, the wireless device may refer to a communication modem/circuit/chip.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In this specification, the wireless device may refer to a communication modem/circuit/chip.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The one or more processors 102 and 202 may be implemented as at least one computer readable medium (CRM) including instructions based on being executed by the at least one processor.

For example, each method described in FIGS. 13 to 14 may be performed by at least one computer readable medium (CRM) including instructions based on being executed by at least one processor. The CRM may perform, for example, determining the number of coded modulation symbols of the UCI and transmitting the UCI on the TBoMS PUSCH transmitted through a plurality of slots. At this time, the number of the coded modulation symbols of the UCI is determined based on i) a value obtained by multiplying the sum of the number of resource elements that can be used for transmission of the UCI in OFDM symbols from symbol index 0 to $N^{PUSCH}_{symb,all}$ in one slot with the UCI transmission among the plurality of slots by the number (Z) of slots configured for the TBoMS PUSCH and ii) the total number of bits transmitted through the TBoMS PUSCH. The $N^{PUSCH}_{symb,all}$ is the total number of OFDM symbols of the PUSCH in the one slot.

The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combinations thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 16:
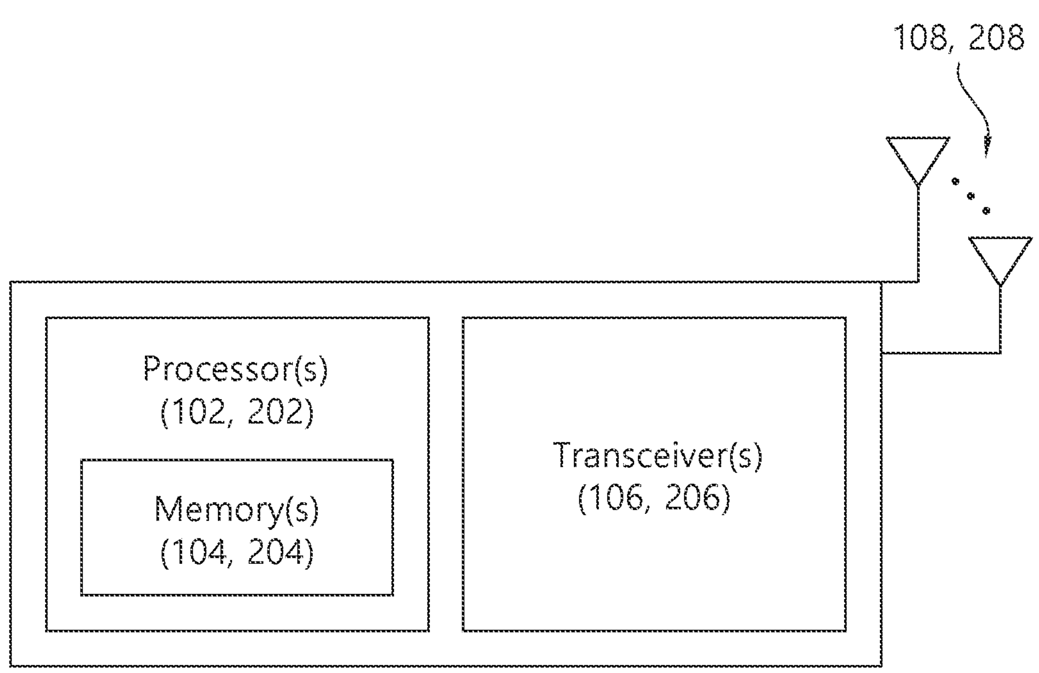
FIG. 16 shows another example of a wireless device.

FIG. 16 shows another example of a wireless device.

Referring to FIG. 16, the wireless device may include at least one processor 102, 202, at least one memory 104, 204, at least one transceiver 106, 206, and one or more antennas 108, 208.

The example of the wireless device described in FIG. 16 is different from the example of the wireless described in FIG. 15 in that the processors 102 and 202 and the memories 104 and 204 are separated in FIG. 15 whereas the memories 104 and 204 are included in the processors 102 and 202 in the example of FIG. 16. That is, the processor and the memory may constitute one chipset.

Figure 17:
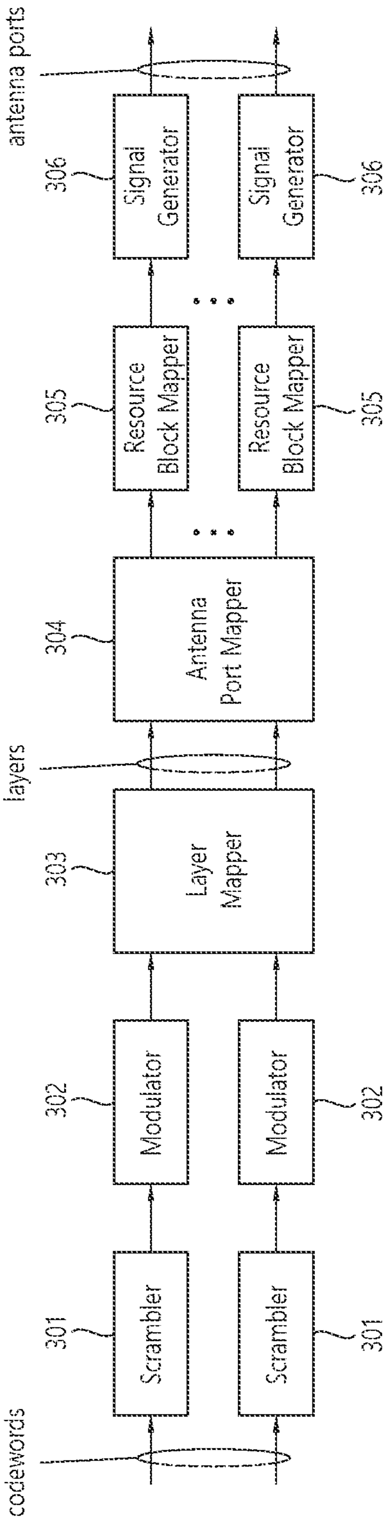
FIG. 17 shows an example of the structure of a signal processing module.

FIG. 17 shows an example of a structure of a signal processing module. Herein, signal processing may be performed in the processors 102 and 202 of FIG. 15.

Referring to FIG. 17, the transmitting device (e.g., a processor, the processor and a memory, or the processor and a transceiver) in a UE or BS may include a scrambler 301, a modulator 302, a layer mapper 303, an antenna port mapper 304, a resource block mapper 305, and a signal generator 306.

The transmitting device can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 18:
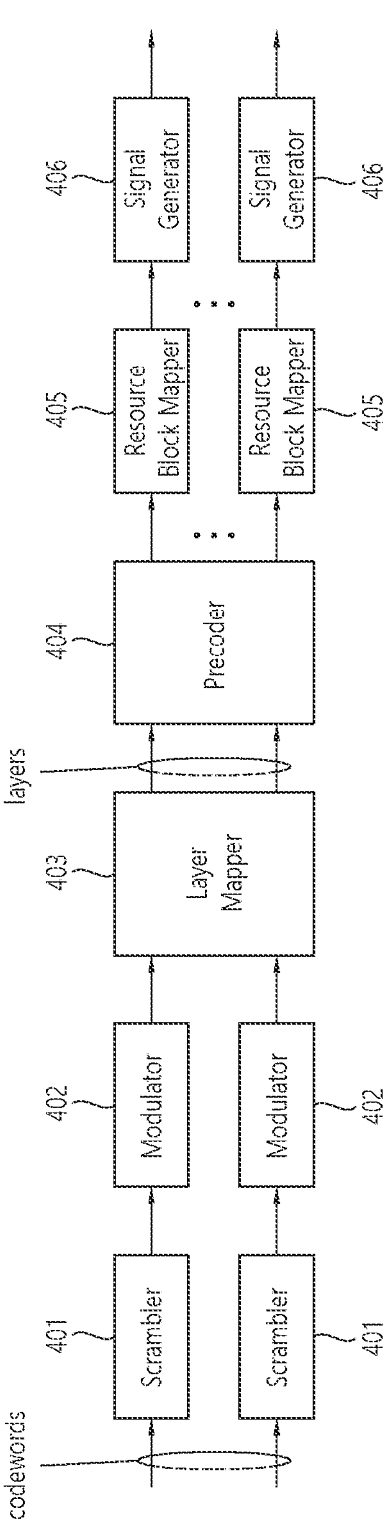
FIG. 18 shows another example of the structure of a signal processing module in a transmission device.

FIG. 18 shows another example of a structure of a signal processing module in a transmitting device. Herein, signal processing may be performed in a processor of a UE/BS, such as the processors 102 and 202 of FIG. 15.

Referring to FIG. 18, the transmitting device (e.g., a processor, the processor and a memory, or the processor and a transceiver) in the UE or the BS may include a scrambler 401, a modulator 402, a layer mapper 403, a precoder 404, a resource block mapper 405, and a signal generator 406.

The transmitting device can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device may be reverse to the signal processing procedure of the transmitting device. Specifically, the processor of the transmitting device decodes and demodulates RF signals received through antenna ports of the transceiver. The receiving device may include a plurality of reception antennas, and signals received through the reception antennas are restored to baseband signals, and then multiplexed and demodulated according to MIMO to be restored to a data string intended to be transmitted by the transmitting device. The receiving device may include a signal restoration unit that restores received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit that removes a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 19:
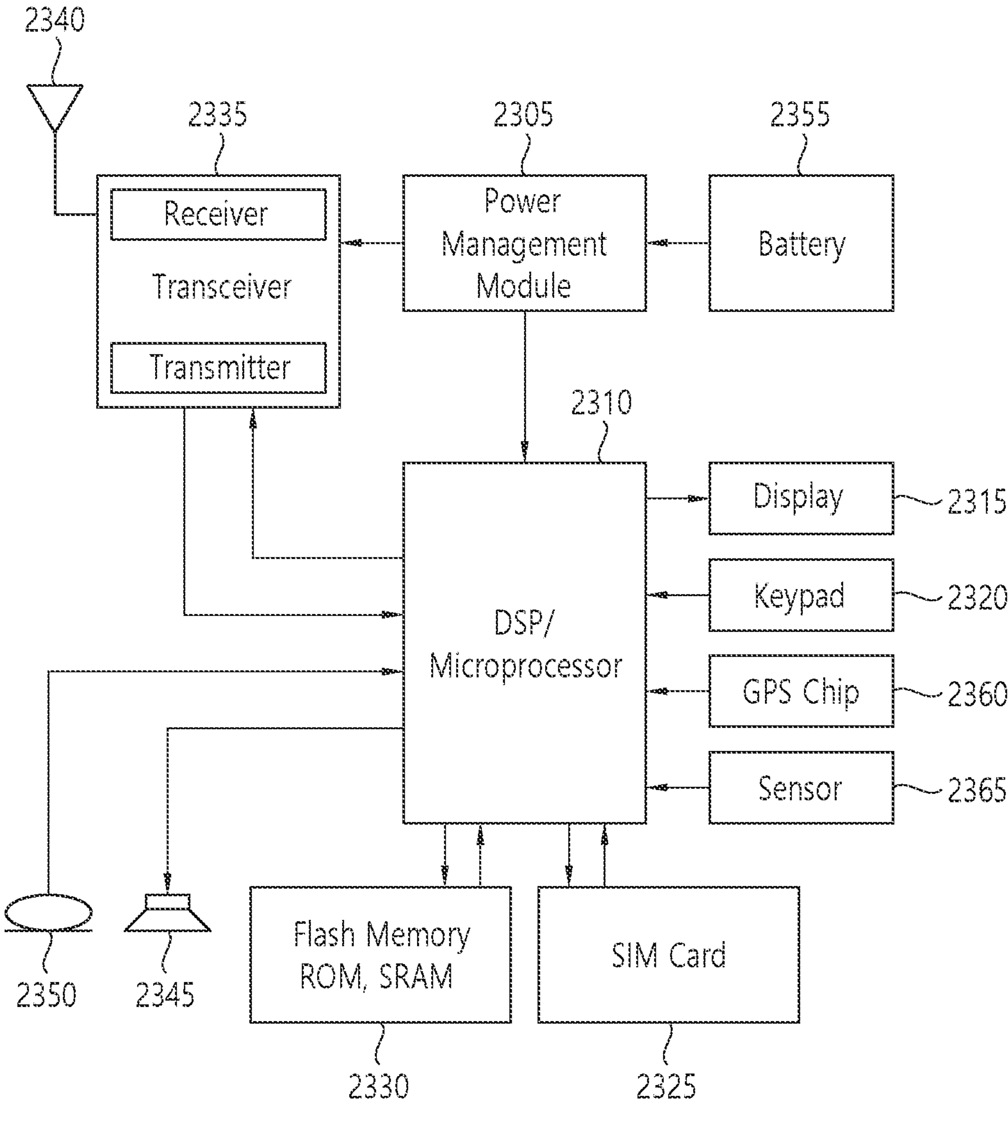
FIG. 19 illustrates an example of a wireless communication device according to an embodiment of the present disclosure.

FIG. 19 illustrates an example of a wireless communication device according to an implementation example of the present disclosure.

Referring to FIG. 19, the wireless communication device, for example, a UE may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 19 may be the processors 102 and 202 in FIG. 15.

The memory 2330 is connected to the processor 2310 and stores information related to operations of the processor. The memory may be located inside or outside the processor and connected to the processor through various techniques such as wired connection and wireless connection. The memory 2330 in FIG. 19 may be the memories 104 and 204 in FIG. 15.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 19 may be the transceivers 106 and 206 in FIG. 15.

Although not shown in FIG. 19, various components such as a camera and a universal serial bus (USB) port may be additionally included in the UE. For example, the camera may be connected to the processor 2310.

FIG. 19 is an example of implementation with respect to the UE and implementation examples of the present disclosure are not limited thereto. The UE need not essentially include all the components shown in FIG. 19. That is, some of the components, for example, the keypad 2320, the GPS chip 2360, the sensor 2365 and the SIM card 2325 may not be essential components. In this case, they may not be included in the UE.

FIG. 20 shows another example of a wireless device applied to the present specification. The wireless device may be implemented in various forms according to a use-case/service.

Referring to FIG. 20, wireless devices 100 and 200 may correspond to the wireless devices of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 21), the vehicles (100*b*-1 and 100*b*-2 of FIG. 21), the XR device (100*c* of FIG. 21), the hand-held device (100*d* of FIG. 21), the home appliance (100*e* of FIG. 21), the IoT device (100*f* of FIG. 21), a digital broadcast UE, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. In addition, each element, component, unit/portion, and/or module within the wireless devices 100 and 200 may further include one or more elements. For example, the control unit 120 may be configured by a set of one or more processors. For example, the control unit 120 may be configured by a set of a communication control processor, an application processor, an Electronic Control Unit (ECU), a graphical processing unit, and a memory control processor. For another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 21:
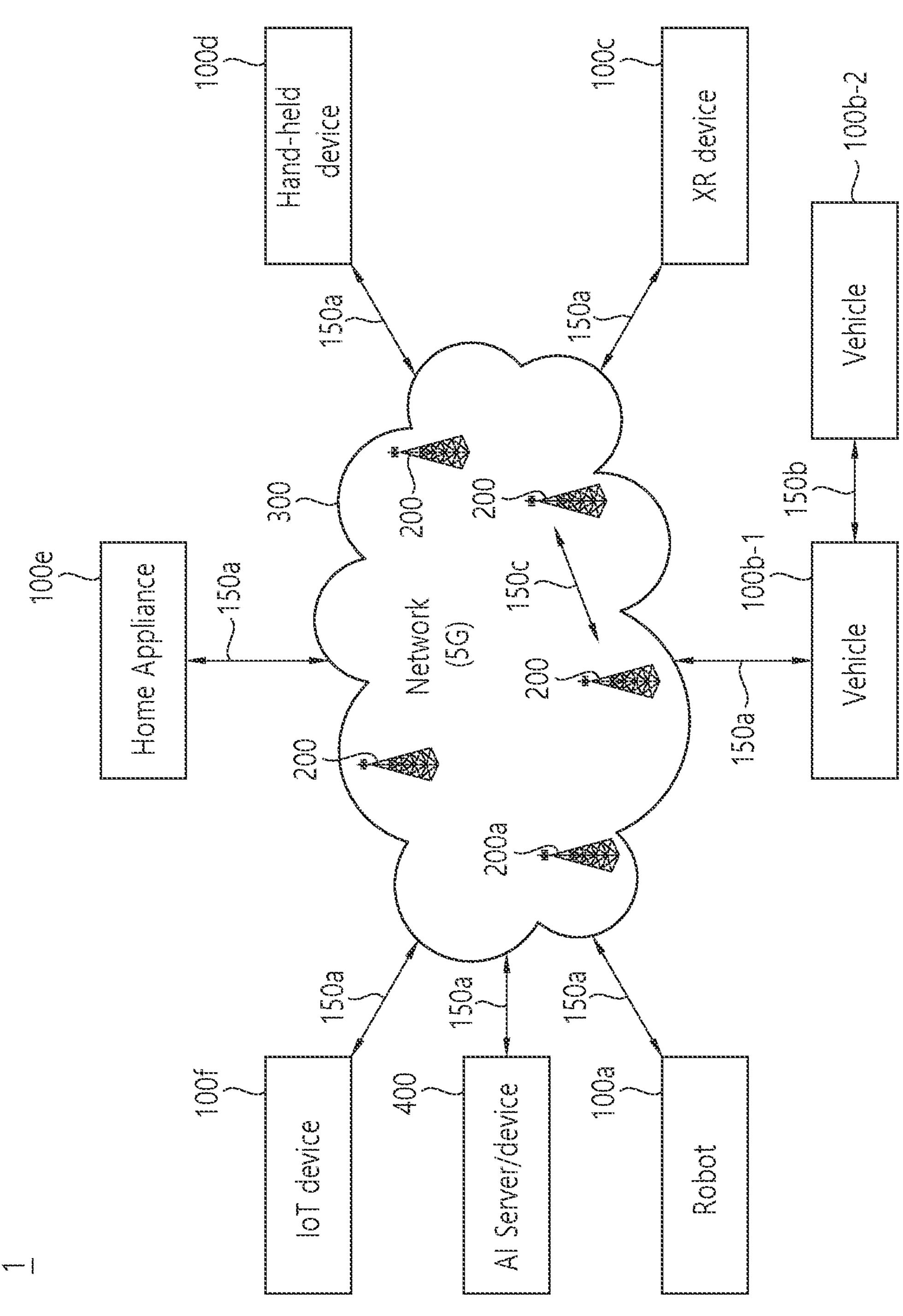
FIG. 21 illustrates the communication system 1 applied to this specification.

FIG. 21 illustrates a communication system 1 applied to the present specification.

Referring to FIG. 21, a communication system 1 applied to the present specification includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). In addition, the IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Here, the wireless communication technology implemented in the wireless devices 100 and 200 of the present specification may include a narrowband Internet of Things for low-power communication as well as LTE. NR, and 6G. At this time, for example, NB-IoT technology may be an example of LPWAN (Low Power Wide Area Network) technology, and it may be implemented in standards such as LTE Cat NB1 and/or LTE Cat NB2, and is not limited to the above-described name. Additionally or alternatively, the wireless communication technology implemented in the wireless devices 100 and 200 of the present specification may perform communication based on the LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100 and 200 of the present specification may include at least one of ZigBee, Bluetooth, and Low Power Wide Area Network (LPWAN) in consideration of low power communication, and is not limited to the above-mentioned names. For example, the ZigBee technology can create PAN (personal area networks) related to small/low-power digital communication based on various standards such as IEEE 802.15.4, and can be called by various names.

NR supports a plurality of numerologies (or a plurality of ranges of subcarrier spacing (SCS)) in order to support a variety of 5G services. For example, when SCS is 15 kHz, a wide area in traditional cellular bands is supported; when SCS is 30 kHz/60 kHz, a dense-urban, lower-latency, and wider-carrier bandwidth is supported; when SCS is 60 kHz or higher, a bandwidth greater than 24.25 GHz is supported to overcome phase noise.

NR frequency bands may be defined as frequency ranges of two types (FR1 and FR2). The values of the frequency ranges may be changed. For example, the frequency ranges of the two types (FR1 and FR2) may be as shown in Table 5. For convenience of description, FR1 of the frequency ranges used for an NR system may refer to a "sub 6 GHz range", and FR2 may refer to an "above 6 GHz range" and may be referred to as a millimeter wave (mmW).

TABLE 5

| Frequency range designation | Corresponding frequency range | Subcarrier spacing |
|---|---|---|
| FR1 | 450 MHz-6000 MHz | 15, 30, 60 kHz |
| FR2 | 24250 MHz-52600 MHz | 60, 120, 240 kHz |

As illustrated above, the values of the frequency ranges for the NR system may be changed. For example, FR1 may include a band from 410 MHz to 7125 MHz as shown in Table 6. That is, FR1 may include a frequency band of 6 GHz (or 5850, 5900, 5925 MHz, or the like) or greater. For example, the frequency band of 6 GHz (or 5850, 5900, 5925 MHz, or the like) or greater included in FR1 may include an unlicensed band. The unlicensed bands may be used for a variety of purposes, for example, for vehicular communication (e.g., autonomous driving).

TABLE 6

| Frequency range designation | Corresponding frequency range | Subcarrier spacing |
|---|---|---|
| FR1 | 410 MHz-7125 MHz | 15, 30, 60 kHz |
| FR2 | 24250 MHz-52600 MHz | 60, 120, 240 kHz |

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method, comprising:

determining, by a user equipment (UE), the number of coded modulation symbols per layer for uplink control information (UCI) transmission; and performing, by the UE, a physical uplink shared channel (PUSCH) transmission based on transport block processing over multi-slot (TBoMS), wherein the PUSCH transmission includes the UCI transmission, wherein the number of coded modulation symbols per layer of the UCI transmission is determined based on i) a sum of the number of resource elements that can be used for transmission of UCI in orthogonal frequency division multiplexing (OFDM) symbol 1, for 1=0, 1, 2, . . . , $N^{PUSCH}_{symb,all}-1$, in a slot, and ii) a sum of r-th code block size for uplink shared channel (UL-SCH) of the PUSCH transmission, for r=0, 1, . . . , $C_{UL-SCH}-1$, multiplied by 1/Z, wherein $C_{UL-SCH}$ is the number of code blocks for UL-SCH of the PUSCH transmission, wherein Z is related to the number of slots allocated for the PUSCH, and wherein $N^{PUSCH}_{symb,all}$ is the total number of OFDM symbols of the PUSCH in the slot including all OFDM symbols used for a demodulation reference signal (DMRS).

2. The method of claim 1, wherein the UCI includes hybrid automatic repeat and request acknowledgement (HARQ-ACK).

3. The method of claim 1, wherein the UCI includes channel state information (CSI).

4. The method of claim 1, wherein the UCI includes configured grant-uplink control information (CG-UCI).

5. The method of claim 1, wherein the number of slots (Z) is indicated by downlink control information (DCI).

6. A user equipment (UE), comprising:

at least one transceiver;

at least one memory; and at least one processor operably connectable to the at least one transceiver and the at least one memory, wherein the at least one memory stores instructions that, based on being executed by the at least one processor, cause the at least one processor to perform operations comprising:

determining the number of coded modulation symbols per layer for uplink control information (UCI) transmission; and performing a physical uplink shared channel (PUSCH) transmission based on transport block processing over multi-slot (TBoMS) wherein the PUSCH transmission includes the UCI transmission, wherein the number of coded modulation symbols per layer of the UCI transmission is determined based on i) a sum of the number of resource elements that can be used for transmission of UCI in orthogonal frequency division multiplexing (OFDM) symbol 1, for 1=0, 1, 2, . . . , $N^{PUSCH}_{symb,all}-1$, in a slot, and ii) a sum of r-th code block size for uplink shared channel (UL-SCH) of the PUSCH transmission, for r=0, 1, . . . , $C_{UL-SCH}-1$, multiplied by 1/Z, wherein $C_{UL-SCH}$ is the number of code blocks for UL-SCH of the PUSCH transmission, wherein Z is related to the number of slots allocated for the PUSCH, and wherein $N^{PUSHC}_{symb,all}$ is the total number of OFDM symbols of the PUSCH in the slot including all OFDM symbols used for a demodulation reference signal (DMRS).

7. The UE of claim 6, wherein the UCI transmission includes hybrid automatic repeat and request acknowledgement (HARQ-ACK) transmission.

8. The UE of claim 6, wherein the UCI transmission includes channel state information (CSI) transmission.

9. The UE of claim 6, wherein the UCI transmission includes configured grant-uplink control information (CG-UCI) transmission.

10. The UE of claim 6, wherein Z is indicated by downlink control information (DCI).

11. A base station comprising:

at least one transceiver;

at least one memory; and at least one processor operably connectable to the at least one transceiver and the at least one memory, wherein the at least one memory stores instructions that, based on being executed by the at least one processor, cause the at least one processor to perform operations comprising:

transmitting downlink control information related to the number of slots (Z) allocated for a physical uplink shared channel (PUSCH) based on transport block processing over multi-slot (TBoMS) to a user equipment (UE); and receiving uplink control information (UCI) on the PUSCH through a plurality of slots from the UE, wherein the number of coded modulation symbols per layer of the UCI is determined based on i) a sum of the number of resource elements that can be used for transmission of UCI in orthogonal frequency division multiplexing (OFDM) symbol 1, for 1=0, 1, 2, . . ., $N^{PUSCH}_{symb,all}-1$ in a slot and ii) a sum of the r-th code block size for uplink shared channel (UL-SCH) of a transmission of PUSCH, for r=0, 1, . . . , $C_{UL\text{-}SCH}-1$, multiplied by 1/Z, wherein $C_{UL\text{-}SCH}$ is the number of code blocks for UL-SCH of the transmission of the PUSCH, wherein Z is related to the number of slots allocated for the PUSCH, and wherein $N^{PUSCH}_{symb,all}$ is the total number of OFDM symbols of the PUSCH in the slot including all OFDM symbols used for a demodulation reference signal (DMRS).

* * * * *